United States Patent
Tomlinson et al.

(10) Patent No.: US 10,742,815 B1
(45) Date of Patent: Aug. 11, 2020

(54) AUTOMATED COMMUNICATION ROUTING SYSTEM

(71) Applicant: Electronic Arts Inc., Redwood City, CA (US)

(72) Inventors: Matthew Douglas Tomlinson, Cedar Park, TX (US); Michael Arleth Pedersen, Austin, TX (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/699,841

(22) Filed: Sep. 8, 2017

(51) Int. Cl.
*H04M 3/523* (2006.01)
*H04M 3/51* (2006.01)
*G06F 16/951* (2019.01)

(52) U.S. Cl.
CPC ........ *H04M 3/5232* (2013.01); *G06F 16/951* (2019.01); *H04M 3/5191* (2013.01)

(58) Field of Classification Search
CPC . H04M 3/5232; H04M 3/5191; G06F 16/951; G06F 17/30864
USPC .................................................. 379/265.09
See application file for complete search history.

(56) References Cited

U.S. PATENT DOCUMENTS

| 5,825,869 A * | 10/1998 | Brooks ................ H04M 3/51 379/265.12 |
| 7,245,716 B2 * | 7/2007 | Brown ................ H04M 3/523 379/266.01 |
| 2002/0131399 A1 * | 9/2002 | Philonenko ............. H04L 29/06 370/351 |

OTHER PUBLICATIONS

*How to be Successful with Salesforce*, Salesforce User Guide, Summer '17, pp. 1-6779 (Jun. 8, 2017) (uploaded in 6 parts).
*The State of the Social Engagement*, Lithium, 2017, pp. 1-48.
*CxEngage Public REST API Reference*, CXengage, Oct. 20, 2016 Version 1.1. pages 1-352.
*2017 Customer Service Trends: Operations Become Smarter And More Strategic*, Vision: The contact Centers For Customer Service Playbook, Forrester, Kate Leggett et al., Jan. 27, 2017, pp. 1-16.

* cited by examiner

*Primary Examiner* — Ahmad F. Matar
*Assistant Examiner* — Jirapon Intavong
(74) *Attorney, Agent, or Firm* — Knobbe, Martens, Olson & Bear, LLP

(57) ABSTRACT

Responders and requesters can be assigned a score while waiting. Requesters and responders are matched via an auction type system, where requesters with the best requester scores are matched with requesters with the best responder scores. The requester scores can be boosted while the requester is waiting for a response if the requester performs certain actions. The requester score and responder score can increase over time. The requester score and responder score can also be based on other variables.

20 Claims, 11 Drawing Sheets

AUTOMATED COMMUNICATION ROUTING SYSTEM

BACKGROUND

Automated call centers route calls from large numbers of people. Sometimes the call centers receive more calls than can be handled by currently available responders. The call center can direct callers through an automated directory, and may place each caller into a first in, first out (FIFO) queue to speak with a responder based on the type of issue selected by the caller. This has the effect of placing each new caller at the end of a queue or line to speak with the next available responder for the selected issue.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment discloses a system comprising: a communication infrastructure, one or more data storage devices, and one or more processors. The communication infrastructure is configured to: receive a first communication request from a first requester; and after receiving the first communication request, receive a second communication request from a second requester. The one or more data storage devices include: a plurality of responder profiles, each identifying a topics supported by a responder and a responder score; and a plurality of requester profiles, each identifying a requester and a requester score. The one or more processors are configured to execute computer-readable instructions that, when executed by the one or more processors, cause the one or more processors to: determine a first requester score associated with the first requester, the first requester score comprising a first score value and a first score rate; determine a second requester score associated with the second requester, the second requester score comprising a second score value and an second score rate; increment the first score value at the first score rate while the first requester waits for a response to the first communication request; increment the second score value at the second score rate while the second requester waits for a response to the second communication request; while the second requester is waiting for the response, transmit data configured to prompt the second requester to perform an action; detect, while the second requester is waiting for the response, a performance of the action by the second requester; in response to detecting the performance of the action by the second requester, modify the second requester score; receive an indication that a responder is available to respond to the first request and to respond to the second request; compare the second requester score to the first requester score; and in response to the comparison of the second requester score to the first requester score, configure the communication infrastructure to arrange a communication channel between the second requester and the responder.

Another embodiment discloses a method for routing communication requests, the method comprising: receiving a first communication request from a first requester; determining a first requester score associated with the first requester, the first requester score comprising a first score value and a first score rate; receiving a second communication from a second requester after receiving the first communication request; determining a second requester score associated with the second requester, the second requester score comprising a second score value and an second score rate; incrementing the value of the first requester score at the first score rate while the first requester waits for a response to the first communication request; incrementing the value of the second requester score at the second score rate while the second requester waits for a response to the second communication request; while the second requester is waiting for the response to the second communication request, transmitting data configured to ask the second requester to perform an action; while the second requester is waiting for the response, detecting a performance of the action by the second requester; in response to detecting the performance of the action by the second requester, modifying at least one of the second score value or the second score rate; determining that a responder is available to respond to the communication request about the topic; determining that the second requester score is better than the first requester score; and in response to the determination that the second requester score is better than the first requester score, arranging a communication channel between the second requester and the responder.

Another embodiment discloses a system comprising one or more processors configured to execute computer-readable instructions that, when executed by the one or more processors, cause the one or more processors to: receive a first communication request from a first requester; after receiving the first communication request, receive a second communication request from a second requester; assign, as part of a profile for the first responder, a first requester score associated with the first requester, the first requester score comprising a first score value and a first score rate; assign, as part of a profile for the second responder, a second requester score associated with the second requester, the second requester score comprising a second score value and an second score rate; increment the value of first requester score at the first score rate while the first requester waits for a response to the first communication request; increment the value of second requester score at the second score rate while the second requester waits for a response to the second communication request; while the second requester is waiting for the response, transmit data configured to prompt the second requester to perform an action; detect, while the second requester is waiting for the response, a performance of the action by the second requester; in response to detecting the performance of the action by the second requester, modify the second requester score; receive an indication that a responder is available to respond to the first request and to respond to the second request; comparing the second requester score to the first requester score; and in response to the comparison of the second requester score to the first requester score, configure a communication infrastructure to arrange a communication channel between the second requester and the responder.

For purposes of summarizing the disclosure, certain aspects, advantages, and novel features have been described herein. It is to be understood that not necessarily all such advantages may be achieved in accordance with any particular embodiment. Thus, any embodiment may achieve or optimize one advantage or group of advantages as taught herein without necessarily achieving other advantages as taught or suggested herein.

Although certain embodiments and examples are disclosed herein, inventive subject matter extends beyond the examples in the specifically disclosed embodiments to other alternative embodiments and/or uses, and to modifications and equivalents thereof.

DETAILED DESCRIPTION

Overview

Figure 1A:
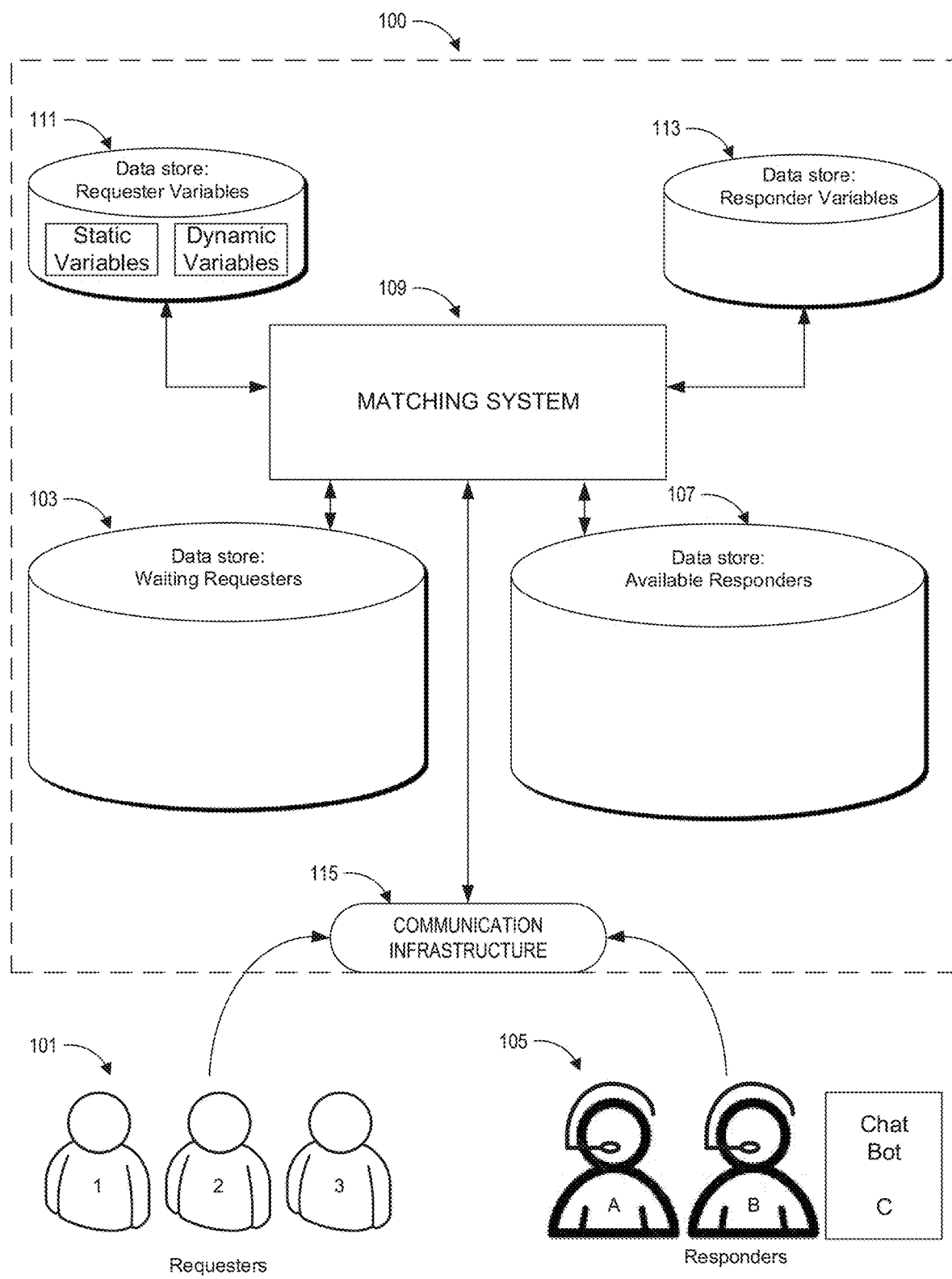
FIG. 1A illustrates an embodiment of system for an automated communications routing system.

While traditional first in, first out (FIFO) queues/lines can be fair, there remains room for improved experiences. Some embodiments of the automated communications routing system disclosed herein can incentivize and reward requesters with shorter wait times and/or improved customer service. The automated communications routing system can use a scoring and matching system to match communication requests from requesters with responders. In some embodiments, the average wait time can be shortened for all requesters.

As an example embodiment of the scoring and matching disclosed herein, requesters may be matched with responders in a different order from the order that requesters placed requests for communication. In an example related to video games, Requester #1 makes a telephone call for troubleshooting an issue related to a video game. Subsequently, Requester #2 makes a telephone call for troubleshooting an issue related to the video game. Each requester is assigned a score including an initial score value and a rate of increase for the score. The Both Requester #1 and Requester #2 are placed on hold and prompted to access a self-troubleshooting guide available online. Requester #2 accesses the guide and attempts to troubleshoot the problem, but is unsuccessful in resolving the problem and continues to wait on hold. The scoring and matching system can detect that Requester #2 accessed the troubleshooting guide. As a result, Requester #2's score can be boosted. Boosting the score can increase the score value and/or the rate of increase of the score. When a responder becomes available, the scoring and matching system can match the available responder with the requester with the highest score. This can result in Requester #2 being matched with the responder before Requester #1, even though Requester #1 initiated a communication request prior to Requester #2.

As another example embodiment of the scoring and matching system disclosed herein, requesters may be matched with responders of different skill levels. In an example related to video games, Requesters #1, #2, and #3 make communication requests (such as, telephone calls) for troubleshooting issues related to a video game. Requesters #1, #2, and #3 are assigned scores, placed on hold, and prompted to access a self-troubleshooting guide available online. Requester #2 accesses the guide and attempts to troubleshoot the problem, but is unsuccessful and continues to wait on hold. The scoring and matching system can detect that Requester #2 accessed the troubleshooting guide boost the score associated with Requester #2. Responder A, Responder B, and an automated computer controlled responder C (such as, a chat bot or cognitive virtual agent) become available for responding to the communication requests. Responder A has the highest customer satisfaction rating, while computer controlled responder C has the lowest. Requester #2, who has the highest requester score, can be matched with Responder A. Requester #1 has the next highest requester score, and is matched with the next highest rated available responder, which is Responder B. Requester #3, who has the lowest requester score, is matched with the remaining available responder, which is the computer controlled responder C.

To simplify discussion, the present disclosure is primarily described with respect to an automated communication routing system for video games. However, the present disclosure is not limited as such and may be applied to other types of applications. For example, embodiments disclosed herein may be applied to any type of automated call routing system.

Automated Routing System

Figure 1B:
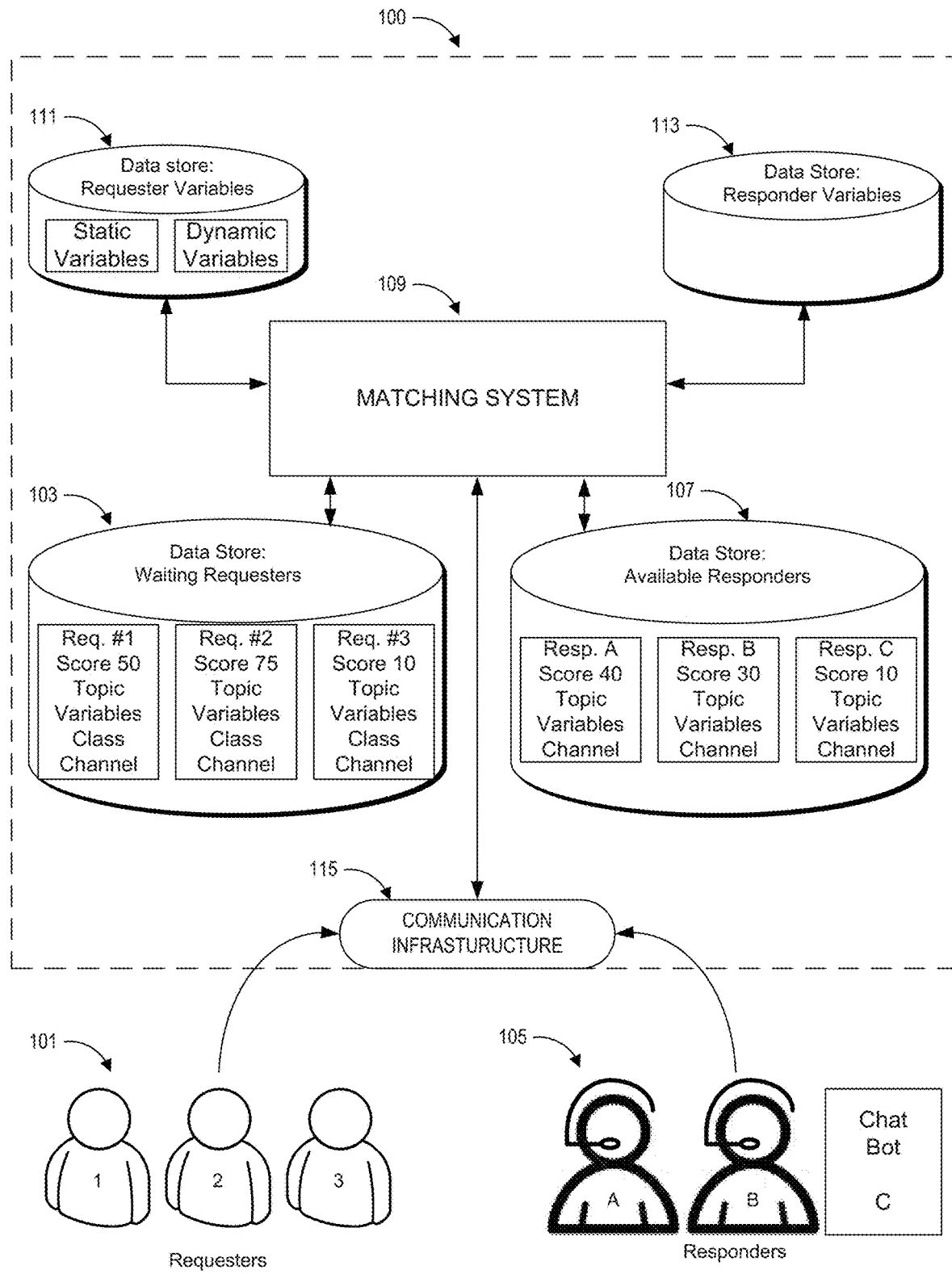
FIG. 1B illustrates another example of the automated routing system of FIG. 1A.

FIG. 1A illustrates an example embodiment for an automated communication routing system 100. The system can include a data store 103 tracking communication requests, a data store 107 tracking available responders, a matching system 109, a data store 111 including requester variables, a data store 113 including responder variables, and a communication infrastructure 115. A plurality of requesters 101 and responders 105 can communicate with the communication infrastructure 115. FIG. 1B illustrates another example of the automated communication routing system 100 when the requesters 101 and responders 105 are in communication over one or more communication channels by way of the communication infrastructure 115, and the data stores 103, 107 are storing profiles for the requesters 101 and responders 105.

The plurality of requesters 101 can include different people (for example, individuals #1, #2, #3) who initiate a request for communication, also referred to as requesters. The requesters may initiate communication requests about various topics using various channels of communication. The channels of communication may include phone calls, text messaging, email, online forums, social media, synchronous and asynchronous network-based chat/messaging systems, video conferencing, video calling, and the like. The communication requests can be related to various topics, such as technical support, billing, placing orders, making an inquiry, providing feedback, and the like. Although three requesters are shown, embodiments can feature any number of requesters.

In an example embodiment related to video games, the requesters are video game players who initiate communication requests related to video games. The requests can be made by phone, within communication channels of a video game such as in-game chat, posted on a video game support forum, and by other communication channels. The requests can be for technical support, to report a bug, to resolve account security issues, to make purchases, to make inquiries, for billing, and for other topics.

A data store 103 can include a requester profile for each communication request. For example, FIG. 1B shows example embodiments of profiles for requesters #1, #2, and #3. The data store requester profiles can include information such as a score(s) associated with the request, an identity of the requester (for example, a user ID or actual identity), contact information, time the request was initiated, how long the requester has been waiting, the channel of communication, the topic, and the like. In some embodiments, no direct queue system is implemented, and the queue ordering of requests is not tracked.

A plurality of responders 105 respond to communication requests. Responders 105 can include people, such as Responder A and Responder B residing at designated call centers at locations throughout the world. Responders 105 can also include automated responders having an artificial intelligence, also referred to as chat bots. The system can be configured so that each responder 105 can respond to communication requests over defined communication channels. For example, chat bot C may only respond to communication requests over chat applications. Each responder 105 may respond to a defined set of topics. Information about the supported topics can be stored in a profile for the responders. The responders 105 can notify the system 100 of the availability to respond to requests. In some embodiments, the system can automatically determine that any responder 105 interfacing with the communication infrastructure 115 but not currently responding to a requester 101 is available to respond to a requester 101. In some cases, responders may provide a notification of their availability (such as available now, will be available at 3 pm, and the like). Although three responders are shown, embodiments can feature any number of responders.

A data store 107 can include responder profiles associated with the active responders capable of responding to pending communication requests. The active responders can refer to responders that are currently responding to communication requests or responders available to respond to communication requests. For example, FIG. 1B shows example embodiments of profiles for active responders A, B, and C. The data store responder profiles can include information such as a score(s) associated with each responder, an identity of the responder (for example, a user ID or actual identity), topics that the responder is prepared to respond to, variables such as how long the responder has been waiting to respond to a communication request, available channels of communication, and the like.

A matching system 109 is configured to determine matches between the requesters 101 and the responders 105. In some embodiments, the matching system 109 can perform auction based matching, where a requester score is used to pair the requester with a responder. The matching system can arrange matches for the responders to communicate with the requester. The matching process can match available responders with requesters based at least in part on various matching criteria, such as, for example, a topic, a communication channel, and other matching criteria.

The matching system 109 is also configured to track information and update the profiles in the data stores 103, 107, 111, 113 to reflect any updates to the tracked information. For example, matching system 109 can track how long a responder 105 has been waiting to take a communication request and/or how long a requester 101 has been waiting for a response, and the matching system can update the profiles in the appropriate data store 103 or 107. As another example, the matching system 109 can receive notifications when a responder has finished handling a previous communication request and in response, assign the responder to a new requester. The matching system 109 is also configured to track, for chat bots running on a computer or server, licenses for and the capacity of a computer or server running the chat bot to determine if another instance of a chat bot is available.

The matching system 109 can score pending communication requests based on requester variables, score available responders based on responder variables, and match requesters with responders based on the respective scores. Some examples discussed herein use the term "highest" scores to refer to scores that satisfies the criteria for matching a requester with a responder. Some embodiments can use any combination of higher/lower/target scores as better scores. The examples discussed herein also use "boosted" to refer to improving an aspect or component of the score. For example, boosting a score can provide an increase to the score value, increase the rate of increase, or modify another aspect or component of the score. Scoring requesters is further discussed with respect to FIG. 3, and scoring responders is further discussed with respect to FIG. 4.

Data store 111 stores requester variables. Examples of requester variables are further discussed with respect to FIG. 2. The variables can include information used to determine a requester score. In some embodiments, the data store 111 includes static variables, which do not change while a communication request is pending, and dynamic variables, which can change while a communication request is pending. For example, the topic for discussion, the preferred communication channel, and a rating of the requester based on past communications are examples of static variables. Dynamic variables can include, for example, whether or not a requester has accessed a self-troubleshooting guide, if they are currently in a game and how long the requester has been waiting. The profile for each requester can also include the static and dynamic variables associated with the requester. Some profile information can be retrieved by accessing one or more other data stores or servers, such as a data store including forum entries, a server where documents are uploaded, a server hosting websites or contents that requesters are prompted to access, and the like.

Data store 113 stores variables associated with responders. Examples of responder variables are further discussed with respect to FIG. 3. The responder variables can include information that is included within a responder profile. In some embodiments, the responder variables can be used to determine a responder score. In some embodiments, the data store can also include static and dynamic responder variables. In some embodiments, values for the static and dynamic variables can be stored as a part of a responder profile.

Although the data stores 103, 107, 111, and 113 are illustrated as separate data stores in FIGS. 1A and 1B, it should be understood that the information discussed with respect to any of the data stores 103, 107, 111, and 113 can be shared, merged, copied, and stored in one, two, three, four, five, or any number of data stores, and not limited to the arrangement shown in FIG. 1.

A communication infrastructure 115 can be any system for receiving and routing one or more types of communications. The communication infrastructure can be configured to receive communications through various communication channels such as email, text, internet submissions, in-game messaging, phone calls, and the like. In some embodiments, the communication infrastructure can include a plurality of different types of communication interfaces that are configured to support multiple channels of communication, can place communicators on hold, and/or route communications. For example, a communication infrastructure can be configured to automatically respond to a requester 101 by asking the requester 101 for identification information, asking the requester 101 about what topic to discuss, and/or placing the requester 101 on hold. Based on a match between a requester 101 and a responder 105, a communication channel can be established to put the requester in contact with the responder. For example, a requester 101 may place a telephone call to the communication infrastructure 115, be placed on hold, and eventually be switched and connected via a telephonic communication channel between the responder 105 and the requester 101.

Example Requester Scoring

Figure 2:
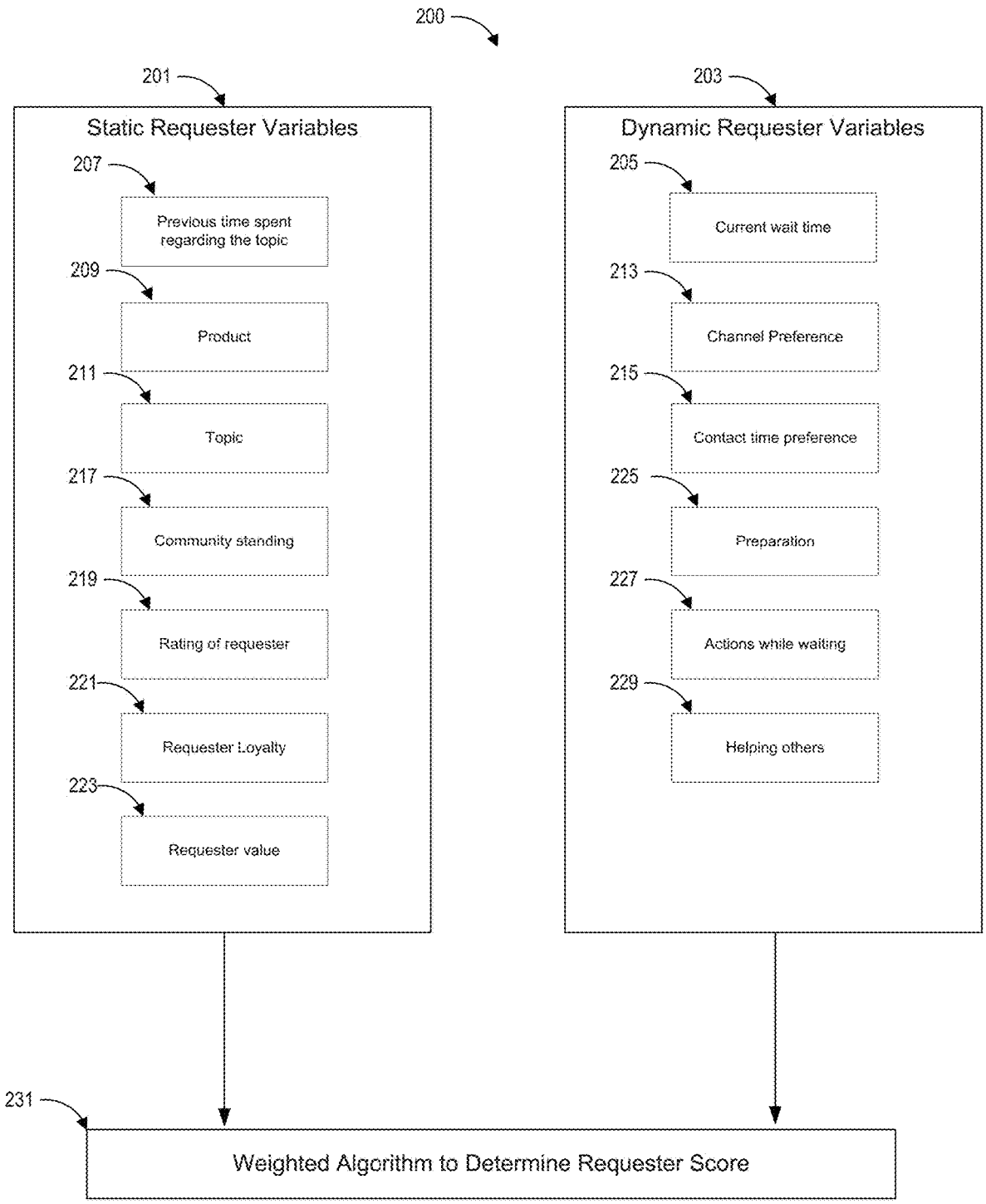
FIG. 2 illustrates an embodiment of assigning a requester score to a requester.

FIG. 2 illustrates a block diagram 200 for assigning a requester score to a requester according to an example embodiment. A requester score can include a value, a rate of change, and/or a class, any of which can be determined based on any combination of static variables 201 and dynamic variables 203. Static variables 201, which do not change while a communication request is pending, and dynamic variables 203, which can change while a communication request is pending, can both be used in determining a requester score. The variables can be stored as part of a requester profile and/or in a database (such as shown in FIG. 1A and FIG. 1B). In some embodiments, requester profiles can be linked to existing user account profiles. In an example related to video games, a requester profile can be created for a caller regarding a technical support issue to run a video game. The requester profile can include an identification of the requester, and a matching system can then search other profiles for identification matches and find, for example, a username that the requester used to play the video game, and link any profiles associated with the username to the requester profile. Accordingly, some or all of the variables discussed herein can be additionally associated with the username or other profiles that are linked to the requester profile.

In some embodiments, there can be more than one class of requester scores. For example, a score can have an associated class, such as a priority class that can also be referred to as a first class, or a normal class that can also be referred to as a second class. In some embodiments, a priority class scores can separate and distinct from normal class score. For example a requester profile may include a priority class scores and normal class score, with each class of score having a corresponding score value and score rate. Requesters having priority class scores may be able to receive expedited help from responders (such as, before normal class requesters) or receive help from priority class responders.

A requester may receive a priority requester score based on a defined priority class criteria. The defined criteria can be satisfied before or during a pending communication request. Prior to the communication request, the criteria may be based on information associated with the requester profile. For example, a priority class score may be earned only by requesters who meet a minimum loyalty 221 threshold and/or have a minimum requester value 223. A requester who satisfies the priority class criteria may receive the priority class score in addition to a normal class score. In some embodiments, when assigning responders to requesters, the responder may be assigned to requesters with priority class scores before being assigned to requesters with normal class scores. In some embodiments, priority class scores are associated with a multiplier or weight when comparing the score value with a normal class. The system may have any number of score classes or only a single score class.

A requester score can include a score rate. The score rate can be a time-based rate that increases a score value at a defined rate (such as, an increase of 1, 2, 5, or another defined value) over a defined period of time (such as, every second, every 5 seconds, every minute, and the like). For example, the score rate increases the value of a requester score at a rate of +1 point per second of wait time 205.

In some embodiments, the score can increase at different rates when waiting based on any of the other requester variables discussed herein. The score rate may be based on various algorithms to increase the score based on desired metrics. For example, the score rate can start an initial rate and then after a defined period of time, the rate can increase in order to help expedite the time in which the communication request will be matched with a requester. In another example, a requester score may increase by +1 point per second, but after the requester performs a diagnostic action while waiting 227 (discussed further below), the rate that the requester score increases can change to +2 points per second.

A requester score can be increased based on any previous time 207 spent waiting to resolve a same or similar topic 207 as the topic in a current communication request. A requester may not fully resolve a topic of discussion during a single communication session. Therefore, any wait time and/or communication time during a first communication session can be credited by increasing the requester score for subsequent communications. As a result, when the requester makes a second effort to resolve the same topic, the requester score can be boosted, thereby shortening the second wait time. The matching system can, in response to receiving first and second requests from a communication a requester about the same topic, determine or modify the value, rate, and/or class of the requester score.

A requester score can be based on a product 209 associated with communication request. Requests for communication about some types of products can receive a boost (such as by modifying or improving the value, rate, and/or class of the requester score) as compared to requests to discuss other types of products.

The requester score can be based in part on the category associated with the request category or topic 211. Some topics can be more important than others, and may warrant a faster response. For example, requesters wanting to discuss security related topics may get a score boost as compared to requesters wanting to discuss sales topics. Accordingly, the matching system can determine or modifying the value, rate, and/or class of the requester score) based at least on a topic selected by the requester. In some embodiments, the topic for discussion can additionally or alternatively be used to match requesters with responders prepared to discuss the topic.

In some embodiments, the score boost provided to different topics 211 can change over time. In an example related to video games, after a video game is released, communication requests for troubleshooting topics can receive a score boost for some period of time, such as within one week after the release. This can help to ensure that requesters trying to get the video game running receive prompt replies. After the initial period of time, troubleshooting topics no longer receive a boosted score. Trending topics can also be tracked by measuring the number of requests received, types of requests received, the frequency of words, and/or the frequency of phrases used on social media over a specific time period (for example every hour). These trending topics can be used to provide a score boost any new requests that come in during a time period (such as the hour or the next few hours) or for as long as the topic is trending. For example, the score boost can be provided as long as words or phrases related to the topic are posted on social media more than a threshold rate.

A requester score can be based on a channel preference 213 indicated by a requester. The channel preference might be indicated, for example, if a requester visits a website to request communication and fills out a form to indicate a desired time of communication and channel of communication (for example, text, email, in-game, or phone). Similarly, requests for communications made over some types of channels can receive score boost as compared to requests for communications made over other types of channels. In one example, a first requester sends a communication request about a topic, indicates a desired response over any communication channel, and is assigned a first requester score. A second requester subsequently sends a communication request about the same topic, indicates a desired response by phone, and is assigned a second requester score. The second requester score is boosted above the first requester score. When a next available responder is available by phone, the next available responder can respond to the second requester. Otherwise, the second requester may have to wait a relatively long time before another responder is available by phone. On the other hand, the first responder is competing in a much larger pool of available responders by email, text, phone, or other communication channel, and the first responder will probably wait a relatively short time before another responder is available.

Some topics are better communicated over certain types of communication channels. For example, troubleshooting a computer may involve restarting the computer. Accordingly, it can be better to communicate about computer troubleshooting problems by telephone instead of by internet messaging, because the internet messaging channel can be disrupted during a computer restart. As a result, to encourage troubleshooting computer problems by telephone, communication requests made by telephone can receive a requester score boost. The matching system can determine or modify a value, rate, and/or class based at least in part on different combinations of the topic and communication channel.

A requester score can be based on a contact time preference 215. For example, a requester may send a request for communication between 2-3 pm by telephone. Shortly before or during the period around 2-3 pm, the requester score can be boosted, causing the requester's communication to be prioritized during that time and for some time afterward. A matching system can determine or modify a value, rate, and/or class based at least in part on a contact time preference.

A requester score can be based on a community standing 217. The matching system can determine a community standing based on an online profile of the requester, a community ranking, status, or popularity of the requester. Requesters who have helped others, made contributions, and/or obtained higher statuses or rankings in a community can receive a score boost. The matching system can determine or modify a value, rate, and/or class of the requester score based at least in part on a community standing. The community standing can be a community standing associated with a username or other profile that is linked to the requester profile, wherein the username or other profile is also associated with the requester.

In some embodiments related to video games, the standing 217 in a video game community can be determined by one or more of: a ranking in a video game competition, a number of views of the requester's gameplay, a number of posts that the requester has made in a forum related to video games, the level of the requester's character in a video game, a number of positive feedback (such as, likes, upvotes, or approvals) that the requester received, and the like. In some examples related to video games, a requester who has contributed to forum discussions, submitted bug reports, answered questions related to the video game, and streamed or posted popular replays or content can receive a score boost. The ranking can be a ranking associated with a username or other profile that is linked to the requester profile, wherein the username or other profile is also associated with the requester.

A requester score can be based on a rating of the requester 217. In some examples, responders can rate the requester as being easy or difficult to work with, as being technologically skilled, for courtesy, and the like after responding to a communication request. This information can be stored in a data store. When the requester makes another communication request, the requester can receive a score boost if the requester had received good ratings. This way, requesters can be incentivized to be easy to work with, much like how many customer service representatives are incentivized to receive high ratings for providing excellent customer service. The rating can be ratings by requesters or by any third party. The matching system can determine or modify a value, rate, and/or class of the requester score based at least in part on a requester score.

In some embodiments related to video games, the rating 217 can also include in-game ratings of the requester. For example, requesters who have been previously flagged for ruining the gameplay experience for others, logged as using inappropriate language, or detected as using hacking or cheating software can receive a requester score penalty.

A requester score can be based on requester loyalty 221. A matching system can determine or modify a value, rate, and/or class of the requester score based at least in part on whether a requester has earned loyalty points, an amount of time since the requester has used a product, activated an account, been a member, and the like.

In some embodiments related to video games, a loyalty 221 can be determined by hours of gameplay, and requesters who have played for longer times can receive a score boost. The hours can be aggregate hours across many video game titles. In some embodiments, the score boost can be tied to a particular topic. For example, a requester who sends a communication request to troubleshoot a particular video game title can receive a score boost for playing that particular video game title for a long time.

A requester score can be based on a requester value 223. Some requesters may be VIP's or have other valuable statuses, and these requesters can receive a score boost based on their value. For example, a VIP can have a requester score that accrues points at a faster rate than a non-VIP. In some embodiments, the value can be based on an amount of business or transactions conducted by the requester. In some embodiments, the value can be based on a purchase of a special edition of a product. The matching system can determine or modify a value, rate, and/or class of the requester score based at least in part on a requester value.

A requester score can be based on preparation activities 225 performed by the requester. For example, a requester can research, search for, conduct an internet search, share, link, post, and/or discuss information about the communication request on a website, frequently asked question (FAQ) site, forum, and/or social media. A requester could also attempt to solve their own problem with a self-service tool or by uploading diagnostic information, which may help to better route the requester. Requesters who fill out more information can receive a score boost and get a response faster. The matching system can determine or modify a value, rate, and/or class of the requester score based at least in part on the performance of preparation activities.

In some embodiments related to video games, a requester goes to a website to request troubleshooting support for a video game. The requester can provide contact info, a troubleshooting topic, and communication preferences. In addition, the requester is given the option to prepare 225 for the communication by searching a forum or frequently asked questions (FAQ) website for similar problems, reading or watching a troubleshooting tutorial, providing diagnostic reports (such as system specifications, a DxDiag report, a crash log file, and the like), launching the video game in a safe mode, rebooting a device, uploading a copy of a disputed bill, and the like. The requester can be notified that a responder will be available shortly. Each of the preparation tasks 225 that the requester performs can be tracked (for example, by determining if a link to a FAQ website is clicked, by detecting an uploaded file, by checking with an online game server if a game is launched in safe mode), and the requester score can be boosted. This way, when a responder is available, the responder can begin troubleshooting the problem with more information and can skip steps (for example, rebooting a device) already performed by the requester. The responder can spend less time troubleshooting this requester's problem, thereby shortening the wait time for other requesters awaiting a response. In some cases, the requester may resolve any questions about a topic by accessing the preparation materials related to the topic without needing a response and disconnect from the communication infrastructure as a waiting requester. This can shorten the overall wait time for all requesters.

A requester score can be based on actions 227 performed by the requester while waiting for a response to the communication request. The actions can include, for example, preparing 225 for the communication as discussed above or helping others 229 as discussed further below. Other examples of actions while waiting can include answering surveys, watching or listening to advertisements, answering questions posted by others on an online forum or social media, testing a product, or even playing a game to make the wait seem shorter. The actions can be tracked, and the requester score can be boosted as a result. The matching system can determine or modify a value, rate, and/or class of the requester score based at least in part on one or more actions performed by the requester while the requester is waiting for a communication response.

A requester score can be based on the requester's help to others 229. For example, if the requester goes to (or has previously gone to) a forum to provide helpful answers to other people's questions about a product, the requester score can be boosted. In some embodiments, questions from other people can be presented to the requester while the requester is waiting, thereby providing the requester an opportunity to help others. In some embodiments, the questions can be questions submitted by other requesters who are also waiting for a responder. This way, some requesters can resolve questions about a topic with each other without a responder. In some embodiments, the questions can be about topics or video games that the requester is familiar with. The help to others can be tracked by a number of responses or by a number of "accepted" or "helpful" responses, as deemed by the party that submitted the original question. A matching system can determine or modify a value, rate, and/or class of the requester score based at least in part on the requester's help to others.

In some embodiments related to video games, the helpfulness can be based on a number of forum posts related to the video game where the requester has provided helpful answers to questions. The more helpful answers the requester provided, the higher the requester score can be boosted.

In some embodiments related to video games, the requester requests communication about a video game, such as billing for in-game purchases. Based on a profile about the requester indicating that the requester has extensively played the video game and/or the selected topic of communication being about the video game, the requester can be presented with other questions about the video game while the requester is waiting for a communications response. For example, another person may have a question about how to modify graphics settings in the video game. The person may or may not also be waiting for a communications response. The question about modifying the graphics setting can be presented to the requester, who receives a score boost for answering the question about graphics. In some embodiments, a first, smaller score boost is immediately given to the requester for answering the question related to graphics. Upon receiving verification by the person that the answer provided by the requester was helpful, the requester can receive a second, larger score boost. Sometimes, the verification is not immediately provided, and is received after the requester has completed the discussion about the billing with a responder. In some embodiments, the second, larger score boost can be carried forward and applied to the requester when the requester makes a later communications request.

The examples of requester variables discussed herein are not exclusive. Variables can be used to reward any good or helpful behavior by boosting the score.

At block 231, a weighted algorithm can account for the requester variables to determine a requester score. The algorithm can be a weighted algorithm, where the different variables are given weights and then summed together to yield the requester score. In some embodiments, different variables can affect other variable scores. The determined score can include an initial score value and an initial score rate. The determined score may also be associated with a specific class (such as, a priority class), or multiple scores may be associated with multiple classes (such as normal score and a priority score). For example, a new communication request may have a score with an initial score value of 50 points and an initial score rate of +5 points per minute. As discussed above, the score value, rate, and/or class can be generated and or adjusted by the aforementioned variables. In this example, the generated score may be based on the current wait time variable 205, but if the requester had a high community standing 217, good rating 219, and completed preparations 225, then the wait time 205 variable can cause the score rate to increase to +20 points per minute. In some embodiments, the different variables provide boosts directly to the score value. For example, a requester can receive a +60 point boost for a high community standing 217, a +50 point boost for having a good rating 219, and a +100 point boost for completed preparations 225. Any combination of variables can affect any one of the value, the rate, and/or the class of the requester score.

Example Responder Scoring

Figure 3:
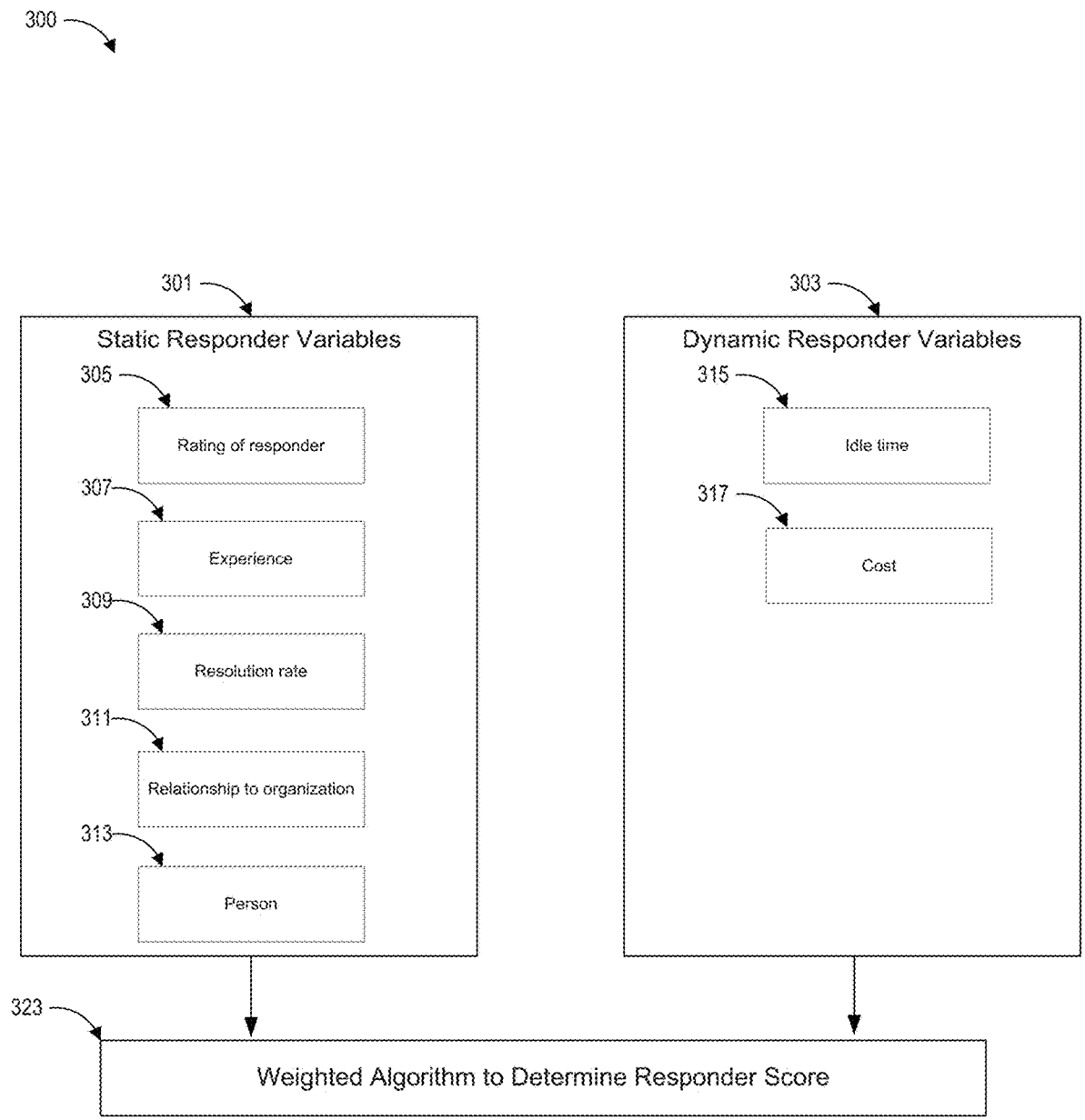
FIG. 3 illustrates an embodiment of assigning a responder score to a responder.

FIG. 3 illustrates a block diagram 300 for assigning a score to a responder according to an example embodiment. Static variables 301, which do not change while a responder is waiting to be assigned a communication request, and dynamic variables 203, which can change while a responder is waiting to be assigned a communication request is pending, can both be used in determining a responder score, which can include determining a value and/or rate of the responder score. In some embodiments, the variables can also determine a class of the responder score.

A rating of the responder 305 can affect the responder score. For example, the responder can be rated based on surveys filled out by previous requesters that the responder has responded to. If the responder provided a highly rated service according to the survey results, then the responder score can be boosted. A matching system can determine or modify a value and/or rate of the responder score based at least in part on the a rating of the responder.

The responder's experience 307 can affect the responder score. The experience can be determined, for example, based on how long the responder has been working as a responder. This can be an overall experience, or it can be more specific, such as experience responding to particular topics. A matching system can determine or modify a value and/or rate of the responder score based at least in part on the responder's experience.

The responder's resolution rate 309 can affect the responder score. Different responders may resolve issues raised by requesters at different rates. Some responders can resolve issues faster, resolve a larger percentage of issues, and/or resolve issues with fewer communication sessions. The responders who are more effective at resolving issues can receive a boost to their responder score. A matching system can determine or modify a value and/or rate of the responder score based at least in part on the responder's resolution rate. The responder's resolution rate 309 can be determined with respect to sub-categories of requests. For example, the resolution rate 309 can be determined per topic, per product, per communication channel, and the like. The resolution rate 309 can also be determined with respect to responder variables, such as experience 307, relationship to organization 311, and whether the responder is a person 313. For example, the resolution rate for topics and trending topics can be tracked to allow the system to tune the routing effectiveness and make automatic adjustments as necessary. If a particular topic has a first success rate (such as 70%) with routing to a chat bot and a second success rate that is greater than the first success rate (such as 71%) with routing to a human responder, then the system can adjust to route more requests regarding the particular topic to human advisors for that topic, such as by boosting the scores of human responders when requests for communications about that topic are received.

A responder score can also be affected by the responder's relationship to an organization 311. For example, a responder score can be boosted for topics relating to a particular product if the responder works for the company that makes the product, as opposed to a responder who works for a call center that is otherwise unaffiliated with the product. As another example, the responder score can be boosted if the responder works in a full time, long term position as opposed to a part time or contracted position. A matching system can determine or modify a value and/or rate of the responder score based at least in part on the responder's relationship to an organization. In some embodiments, the responder's relationship to an organization can be used to determine a responder class such as full time, contract, part time, and the like.

A responder score can also be boosted if the responder is a person 313, as opposed to a chat bot or artificial intelligence system. In some embodiments, both humans and chat bots can be used as responders and be assigned responder scores. Accordingly, a system is provided for comparing bot performance to humans. A matching system can determine or modify a value and/or rate of the responder score based at least in part on whether the responder is a bot or human. In some embodiments, the responder's relationship to an organization can be used to determine a responder class such as human or bot.

A responder score can increase based on how long a requester has been idle 205 and waiting for a request to respond to. By itself, this metric effectively implements a queue. If only the idle time is considered, a responder who has been waiting the longest will have the highest responder score. In some embodiments, the responder score can increase at different rates when idle based on any of the other responder variables discussed herein. For example, a first responder score of a first responder may increase by +1 point per second. A second responder score of a second responder may increase by +2 points per second if the second responder has a high rating 305. The increasing responder score based on idle time can help to distribute requests among idle responders, keeping the responders engaged. In some embodiments, a bot might receive no points for idle time. A matching system can change a responder score according to the rate, and the rate at which the responder score changes can be based at least in part on any of the other static and/or dynamic variables.

A responder score can be affected by a cost 317 for responding. Some responders can be paid a salary or be paid at an hourly rate. Some responders can be paid a contracted rate for each communication request that is responded to. Bots can also incur costs per hour of use, per response, per unit of data, per core used to run the bot, per license for a bot, and the like A less expensive responder can receive a responder score boost as compared to a more expensive responder. In some embodiments, responders can change their costs if the responders feel like they are being assigned too few communication requests. In some embodiments, the degree that a cost affects the responder score can vary based on pending requester demand. For example, if a lot of requesters are waiting for a response, then even high-cost responders can be assigned responder scores with lower or no penalties for being high-cost. A matching system can determine or modify a value and/or rate of the responder score based at least in part on a cost of a responder.

At block 323, a weighted algorithm can account for the responder variables to determine a responder score. The algorithm can be a weighted algorithm, where the different variables are given weights and then summed together to yield the responder score. The determined score can include an initial score value and an initial score rate. The determined score may also be associated with a specific class (such as, a priority class), or multiple scores may be associated with multiple classes (such as normal score and a priority score). In some embodiments, different variables can affect other variable scores. In some embodiments, the different variables provide their own boosts to the score value. For example, a responder can receive a +60 point boost for a high rating 305, a +50 point boost for having a good experience 307, and a +25 point boost for being a person instead of a bot or AI system.

In some embodiments, the responder variables can be used to ensure that minimum levels of responsive service are provided to certain types of requesters. For example, in some embodiments, minimum criteria can include matching people (not bots) with to requesters with a first class score, who have a minimum loyalty score, and/or a minimum value score.

The responder score can be used such that the responder with the highest responder score is assigned to communicate with the next waiting requester with the highest requester score. This can encourage and optimize improved use of time, human resources, and bot/computer resources. Additionally, flexible pricing structures can allow contractors to fill in when the need arises.

Example Timeline

Figure 4:
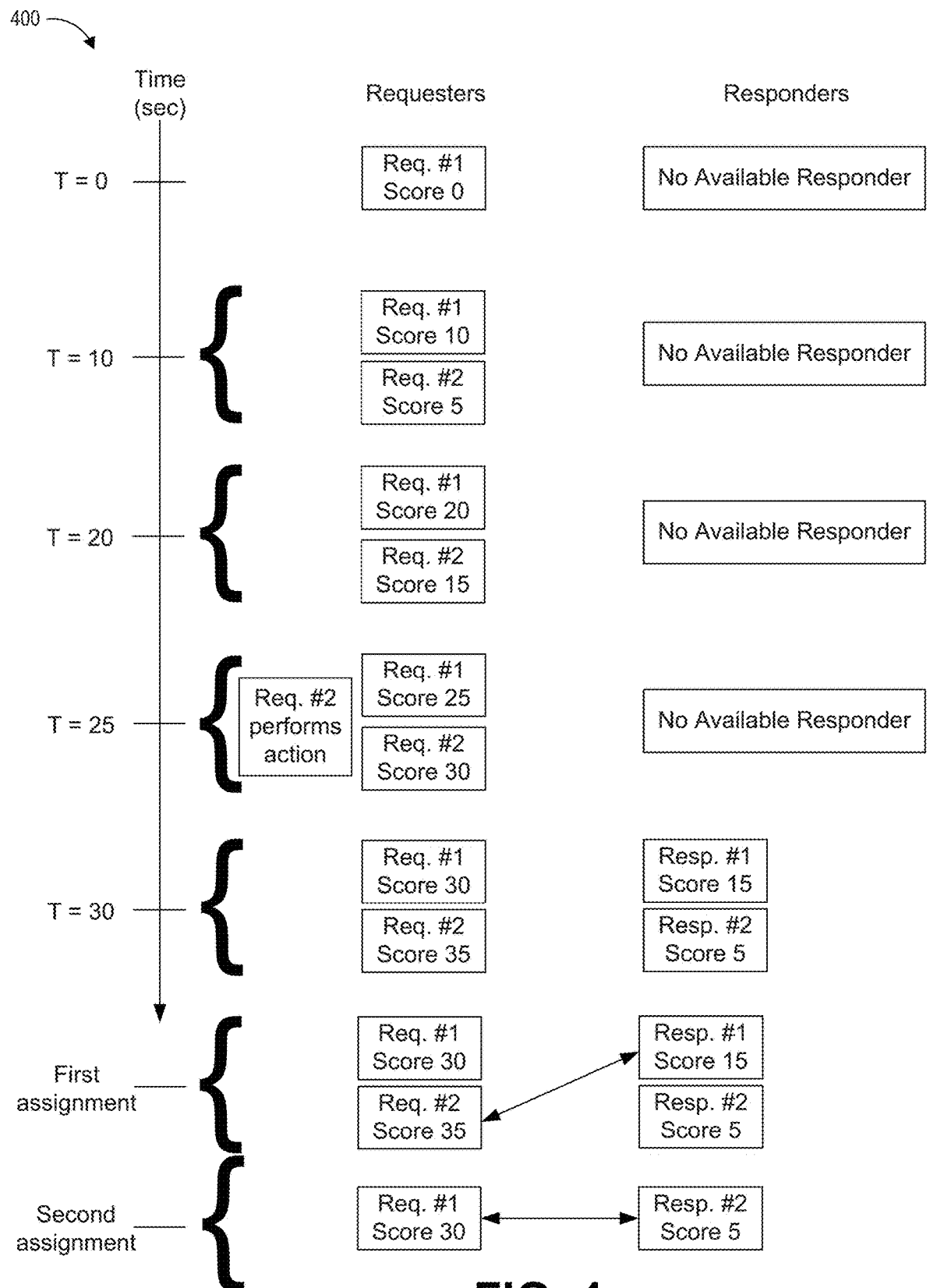
FIG. 4 illustrates an embodiment of a timeline of example events of matching requesters to responders.

FIG. 4 illustrates an example timeline 400 of matching requesters to responders.

Initially, at 0 time units, a first requester makes a communication request, such as a phone call, for technical support. The communication request is received by a call routing system. However, no responders are available. The first requester is placed on hold to wait for a responder to become available and assigned a first requester score with an initial value of 0. At 0 time units, the matching system can determine that the first requester has a requester score with a value of 0 and rate of +1 point per time unit that the first requester is on hold.

From 0 to 10 time units, the first requester score increases with the current wait time, such as described with respect to variable 205 of FIG. 2. In the example shown in FIG. 4, the first requester score increases by one point for each time unit that the first requester waits for an available responder.

At 10 time units, the first requester has accumulated a 10 point value for the first requester score. Also, a second requester makes a communication request, such as a phone call, and is routed for the same issued as the first requester's issue (for example, a technical support request). A responder is still not available, so both the first and second requester are on hold. The second requester starts with a second requester score of 5 (instead of 0), which can be due to any of the factors discussed with respect to FIG. 2. For example the second requester may have previously spent time to resolve the same issue, have a good community standing, be a loyal customer, reserved a time slot, submitted a supporting document before calling, and the like to receive a 5 point boost. At 10 time units, the matching system can determine that the second requester has a second requester score with a value of 5 and rate of +1 point per time unit that the second requester is on hold.

At 20 time units, the first requester score is 20 while the second requester score is 15. The requester scores of the first and second requester both continue to increase at the rate of 1 point per time unit.

At 25 time units, the first requester has a requester score of 25. The second requester performs an action (for example, as discussed with respect to 227 in FIG. 2). For example, while waiting on hold, the second requester may have answered a question on a technical support forum, read a FAQ page, or followed an initial diagnostics and troubleshooting routine available, and the like The matching system detects the performance of the action (for example, by receiving an update from the server hosting the forum where the second requester posted an answer, by receiving an update from a webserver that the second user requested to access the FAQ page, or by receiving a submission of a troubleshooting diagnostics report) and add 10 points to the second requester score. The second requester score of 30 and is now higher than the first requester score. The requester scores of the first and second requester both continue to increase at the rate of 1 point per time unit.

At 30 time units, two responders become available. Responder #1 has a first responder score of 15, and Responder #2 has a second responder score of 5. The first requester score is 30. The second requester score is 35.

A matching system can perform categorical matching between the requesters and responders. This can include, for example, determining which responders support topics that requesters have requested to discuss. This can also include, for example, determining which responders are available to communicate via communication channels selected by the requesters. In the example of FIG. 4, both Responder #1 and Responder #2 are available to respond to the topics for discussion selected by the first requester and the first responder over the communication channels selected by the first requester and the first responder.

A first assignment of a responder to a requester can be made. This can happen by pairing the requester with the highest requester score with a responder having the highest responder score. Responder #1 has the higher responder score, indicating that responder #1 may, for example, receive better ratings or have more experience (for example, as discussed with respect to variables 305 and 307 of FIG. 3), than Responder #2. Responder #1 can be assigned to respond to the second requester, who has the higher requester score of 35. The communication request of the second requester is routed to a communication channel with Responder #1.

A second assignment of a responder to a requester can be made. Only the first requester and Responder #2 remain, and by default they have the highest respective requester and responder scores, respectively. Responder #2 is assigned to respond to the first requester, and the first requester is routed to a communication channel with Responder #2.

In an example, Responder #1 can be a human responder while Responder #2 is an artificially intelligent responder such as a chat bot. The human responder has a responder score based on receiving better feedback than the chat bot. Accordingly, the second requester, in addition to receiving a response sooner, is additionally rewarded for performing the action by being assigned with a more highly rated responder.

In some examples, Responder #1 can be a chat bot while Responder #2 is a human responder. This can occur, for example, if the artificial intelligence programs receive sufficient training, and chat bots become highly rated for their responses.

Example Flowcharts for Matching

Figure 5A:
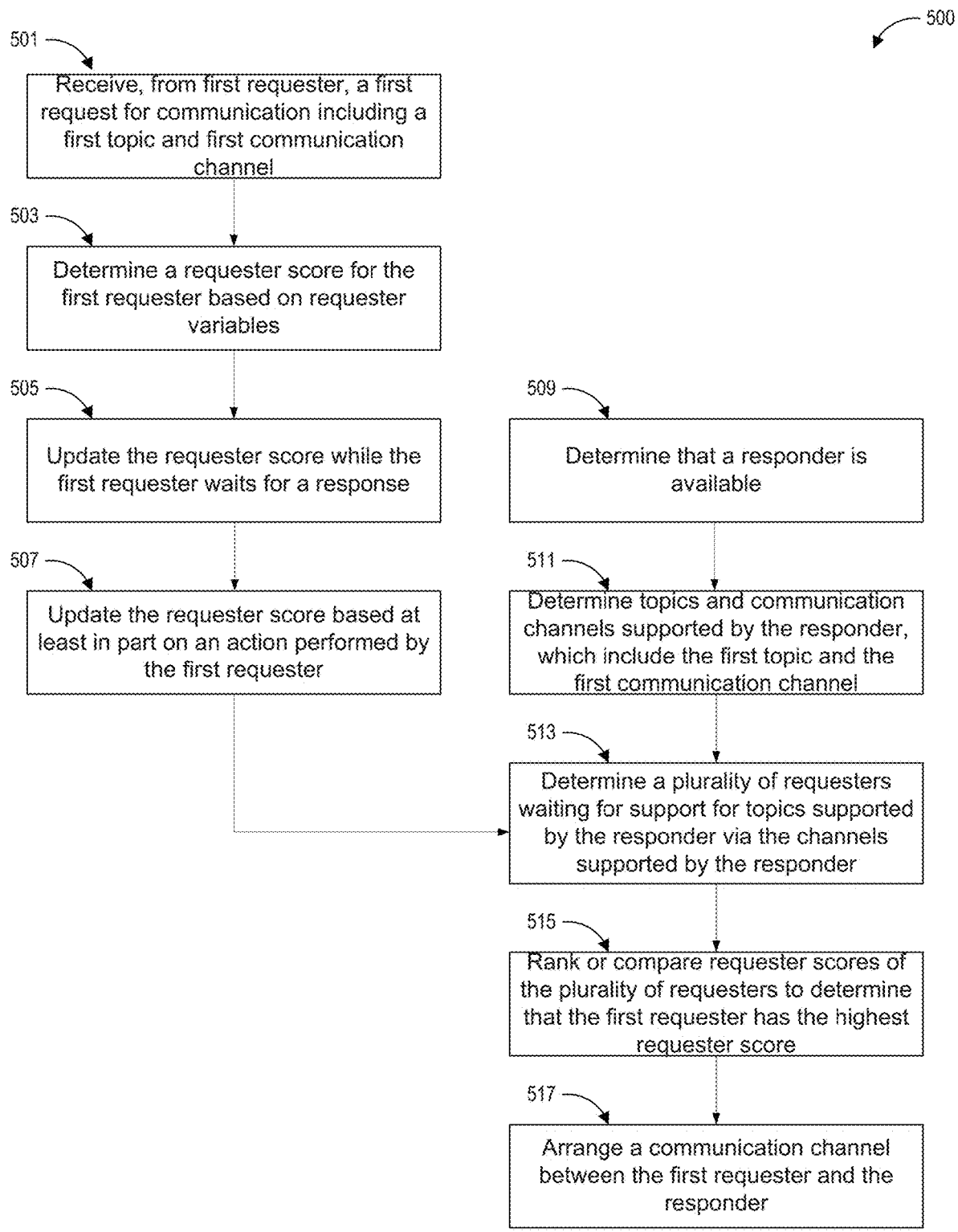
FIG. 5A illustrates an embodiment of a flowchart of matching a requester to a responder.

FIG. 5A shows an example flowchart for a process 500 of matching a requester to a responder. The process 500 can be implemented by any system that can identify match requesters with responders and establishing communication channels between the matched requesters and responders. The process 500, in whole or in part, can be implemented by, for example, a communication routing system 100, a matching system 109, and/or a communication infrastructure 115, among others. Although any number of systems, in whole or in part, can implement the process 500, to simplify discussion the process 500 will be described with respect to particular systems.

At block 501, a first request for communication can be received. The request can be a request to discuss a first topic using a first communication channel (phone, text, email, chat, and the like). The communication channel can be a preferred communication channel and/or the communication channel over which the first request for communication is made on. A profile for the first requester can be created and stored in a data store. The profile can include an identity of the first requester, a requester score for the first requester, the first topic, and the communication channel.

At block 503, a requester score can be determined for the first requester based on any combination of the requester variables discussed with respect to FIG. 2. This can include determining an initial value for the requester score, determining an initial rate of the requester score, and/or determining an initial class of the requester score.

At block 505, the requester score can be updated while the first requester waits for a response. This can include, for example, incrementing the value of the requester score according to the rate.

At block 507, the requester score can be updated based at least in part on an action performed by the first requester. The action can be an action 227 that the requester performs while waiting, as discussed with respect to FIG. 2. Based at least in part on detecting that the action was performed by the first requester, at least one of the value of the requester score, the rate of the requester score, and/or a class of the requester score can be modified.

At block 509, it can be determined that a responder is available.

At block 511, the topics and communication channels supported by the responder can be determined. The supported topics and supported communication channels can include the first topic and the first communication channel.

At block 513, a plurality of requesters waiting for support can be determined. Each requester of the plurality of requesters can have a pending request for communication regarding a supported topic via a supported communication channel. For example, a matching system can access a data store to read the profiles of pending requesters in order to determine which topics and communication channels are associated with those pending requesters. The pending requesters waiting for a response regarding a supported topic via a supported communication channel can be included in the plurality of requesters. In the example shown in FIG. 5A, the supported topics include the first topic, and the supported communication channel includes the first communication channel. Accordingly, the first requester can be included in the plurality of requesters. The plurality of requesters can be a subset of the total number of pending requesters.

At block 515, the requester scores of the plurality of requesters can be compared and/or ranked. This can also include, for example, comparing or ranking the requester scores associated with requesters of the plurality of requesters to determine who has the highest requester score. In some embodiments, this can include, for example, determining which sub-group of requesters have a prioritized class of scores, and within that sub-group of requesters, determining which requester has a highest requester score. In the example shown in FIG. 5, it can be determined that the first requester has the highest requester score (and in some embodiments, the highest requester score in a highest class of requester score).

At block 517, a communication channel can be arranged between the first requester and the responder. This can be based at least in part on the ranking or determination in block 515 that the first requester has the highest requester score.

Figure 5B:
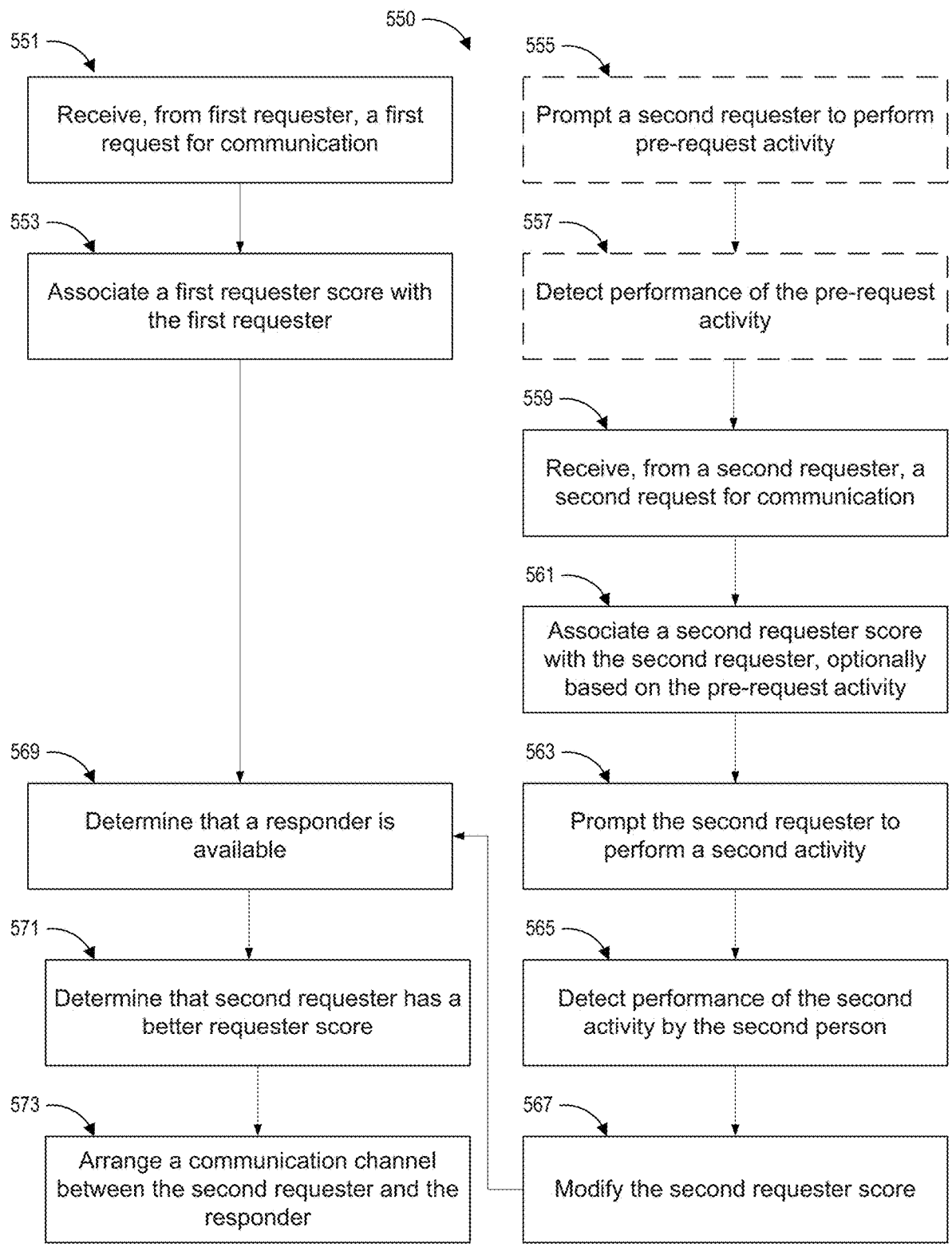
FIG. 5B illustrates an embodiment of a flowchart of requesters waiting to match to a responder.

FIG. 5B illustrates an example flowchart of a process 550 of requesters waiting to match to a responder. The process 550 can be implemented by any system that can identify match requesters with responders and establishing communication channels between the matched requesters and responders. The process 550, in whole or in part, can be implemented by, for example, a communication routing system 100, a matching system 109, and/or a communication infrastructure 115, among others. Although any number of systems, in whole or in part, can implement the process 550, to simplify discussion the process 550 will be described with respect to particular systems.

At block 551, a first request for communication is received from a first requester. The first request for communication can be made through any communication channel, such as email, text, telephone, and the like The first request for communication can be received, for example, at a communication infrastructure 115 as shown in FIG. 1.

At block 553, a first requester score can be associated with the first requester. A data store can keep a profile, where the first requester, the topic of the first request, the first request for communication, and the first requester score are associated. The profile can also track one or more variables associated with the first requester. An initial value, an initial rate of change, and a class can be determined for the first requester score. The initial value and initial rate of change can be based on any of the variables discussed with respect to FIG. 2. The first requester score can be incremented over time according to the initial rate.

At block 555, a second requester can be prompted to perform a pre-request activity. This can be, for example, uploading a document, performing a test, visiting a website, watching a video, a preparation activity 215 discussed in FIG. 2, and the like This can occur, for example, if the second user accesses a website to request contact information to discuss a topic. The website can prompt the second user to access materials or perform actions related to the topic of discussion. For example, the second user may be prompted to access FAQ's, watch a troubleshooting video, upload a document or report, and the like.

At block 557, whether or not the second user performed the pre-request activity can be detected. For example, if the second user was prompted to upload a document or report, the presence of the uploaded document or report is uploaded can be detected. As another example, if the second user is prompted to watch a video or access a FAQ webpage, then accesses from the second requester's computer to the internet resource can be detected.

In some embodiments, blocks 555 and 557 can be option. For example, a second user can visit a website that displays a phone number to call for troubleshooting technical problems and allows for a screenshot of a picture to be submitted. The second user may choose to call the phone number without submitting a screenshot.

At block 559, a second request for communication is received from the second requester. This can occur after receiving the first request for communication from the first requester at block 551. In various embodiments, the first and second requests can be for the same or different topic and can be made through the same or different communication channels. The second request can be received, for example, by the communication infrastructure 115 of FIG. 1.

At block 561, a second requester score can be associated with the second requester. A data store can keep a profile where the second requester, the topic of the second request, the second request for communication, and the second requester score are associated. The profile can also track one or more variables associated with the second requester. This can include, for example, tracking whether or not the second requester optionally performed the pre-request activity. An initial value, an initial rate of change, and an initial class can be determined for the second requester score. In some embodiments, the initial value and/or initial rate can be different based on whether or not the second requester performed the pre-request activity. The initial value, initial rate, and initial class can also be based on any other variable discussed with respect to FIG. 2. For example, the initial value can be different if the second requester has a good community standing. The second requester score can be incremented over time according to the initial rate.

At block 563, the second requester can be prompted to perform a second activity. This can be the same (if not already performed) or different activity from the pre-request activity. For example, the second activity can include any of the actions while waiting 227 discussed with respect to FIG. 2, actions for helping others 229 discussed with respect to FIG. 2, and/or preparation activities 225 discussed with respect to FIG. 2.

At block 565, performance of the second activity by the second person can be detected.

At block 567, the second requester score can be modified based on the performance of the second activity in block 565. This can include changing the value of the second requester score. This can additionally or alternatively include changing the rate at which the second requester score increments.

At block 569, it can be determined that a responder is available. This can include, for example, receiving a notification from the responder that the responder is available, detecting that the responder has established a communication channel with the communication infrastructure (called into a call center, signed into a chat program, and the like), completed a communication and/or paperwork related to an earlier request, and the like. The responder can be available to respond to the topics for discussion requested by the first and second requesters. The responder can also be available to respond via the communication channels requested by the first and second requesters.

At block 571, it can be determined that the second requester has a better requester score. Even under an example scenario where the second requester makes a communication request after the first requester, and then first requester score and the second requester score continue to increment at the same rate, the second requester score might end up higher than the first requester score if the second requester performs the pre-request activity and/or second activity, resulting in a modification of the second requester score. Even under an example scenario where the second requester makes a communication request after the first requester and the first requester score is initially better than the second requester score, the second requester score might increase at a faster rate if the second requester performs the second activity, resulting in a modification of the rate that the second score increases.

At block 573, a communication channel can be arranged between the second requester and the responder. This can include, for example, routing or switching a telephone call initially made by the second requester to telephonically connect to the responder. If, for example, the second requester requested communication by email, then the responder can be assigned to respond to the email sent by the second requester. If, for example, the second requester made the request via internet chat, then the responder can be placed into a chat room with the first requester.

Figure 6:
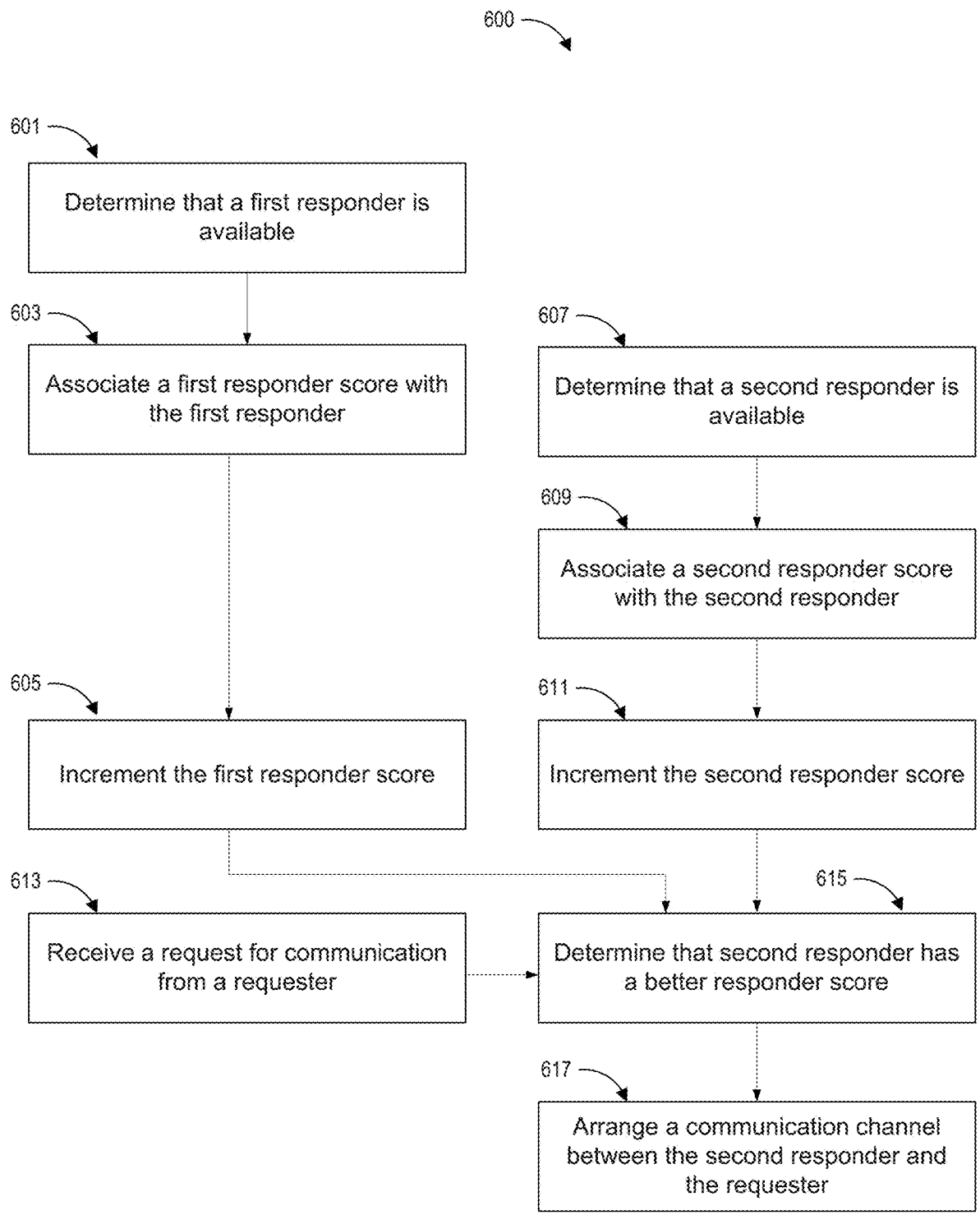
FIG. 6 illustrates another embodiment of a flowchart of responders waiting to match to a requester.

FIG. 6 illustrates an example flowchart of a process 600 of responders waiting to match to a requester. The process 600 can be implemented by any system that can identify match requesters with responders and establishing communication channels between the matched requesters and responders. The process 600, in whole or in part, can be implemented by, for example, a communication routing system 100, a matching system 109, and/or a communication infrastructure 115, among others. Although any number of systems, in whole or in part, can implement the process 600, to simplify discussion the process 600 will be described with respect to particular systems.

At block 601, it can be determined that a first responder is available. For example, a responder can establish a communication channel with a call center or sign into a chat program to indicate availability. In some examples, an available responder can, while already connected with a call center, end a previous call and/or close a file or project related to an older call, thereby indicating that the responder is available to receive a new call.

At block 603, a first responder score can be associated with the first responder. This can be stored in a data store as part of a profile for the first responder. The profile can also include responder variables, such as those described with respect to FIG. 3. The profile can also include, for example, topics that the first responder is prepared to support and communication channels over which the first responder can communicate. The first responder score, including a value of the first responder score and/or a rate at which the first responder score increases, can be based at least in part on the responder variables associated with the first responder.

At block 605, the first responder score can be incremented over time according to a first rate.

At block 607, it can be determined that a second responder is available. In some embodiments, this can be after determining that the first responder is available in block 601.

At block 609, a second responder score can be associated with the second responder. This can be stored in a data store as part of a profile for the second responder. The profile can also include responder variables, such as those described with respect to FIG. 3. The profile can also include, for example, topics that the second responder is prepared to respond to and communication channels over which the second responder can communicate. The second responder score, including a value of the second responder score and/or a rate at which the second responder score increases, can be based at least in part on the responder variables associated with the second responder. Sometimes, due to different responder variables, the second responder score can be assigned an initial value that is greater than an initial value of the first responder score. Sometimes, due to different responder variables, the first responder score and the second responder score can be incremented at different rates.

At block 613, a request for communication can be received from a requester. The requester can request to discuss a topic that the first and second responders are prepared to support. The requester can also initiate or request communication via a communication channel that the responders support.

At block 615, it can be determined that the second requester has a better requester score than the first requester. This can be based on a comparison or ranking of the first responder score and the second responder score. This can even occur when the second responder becomes available at block 607 after the first responder becomes available at block 601, for example, if based on the responder variables associated with the second responder, the second responder is assigned an initial value for the second responder score and/or a different rate of increase for the second responder score. For example, the second responder might cost less, have more experience, receive better feedback ratings, and/ or have a better resolution rate than the first responder, so the initial value of the second responder score can be higher.

At block 617, a communication channel can be arranged between the second responder and the requester.

Figure 7:
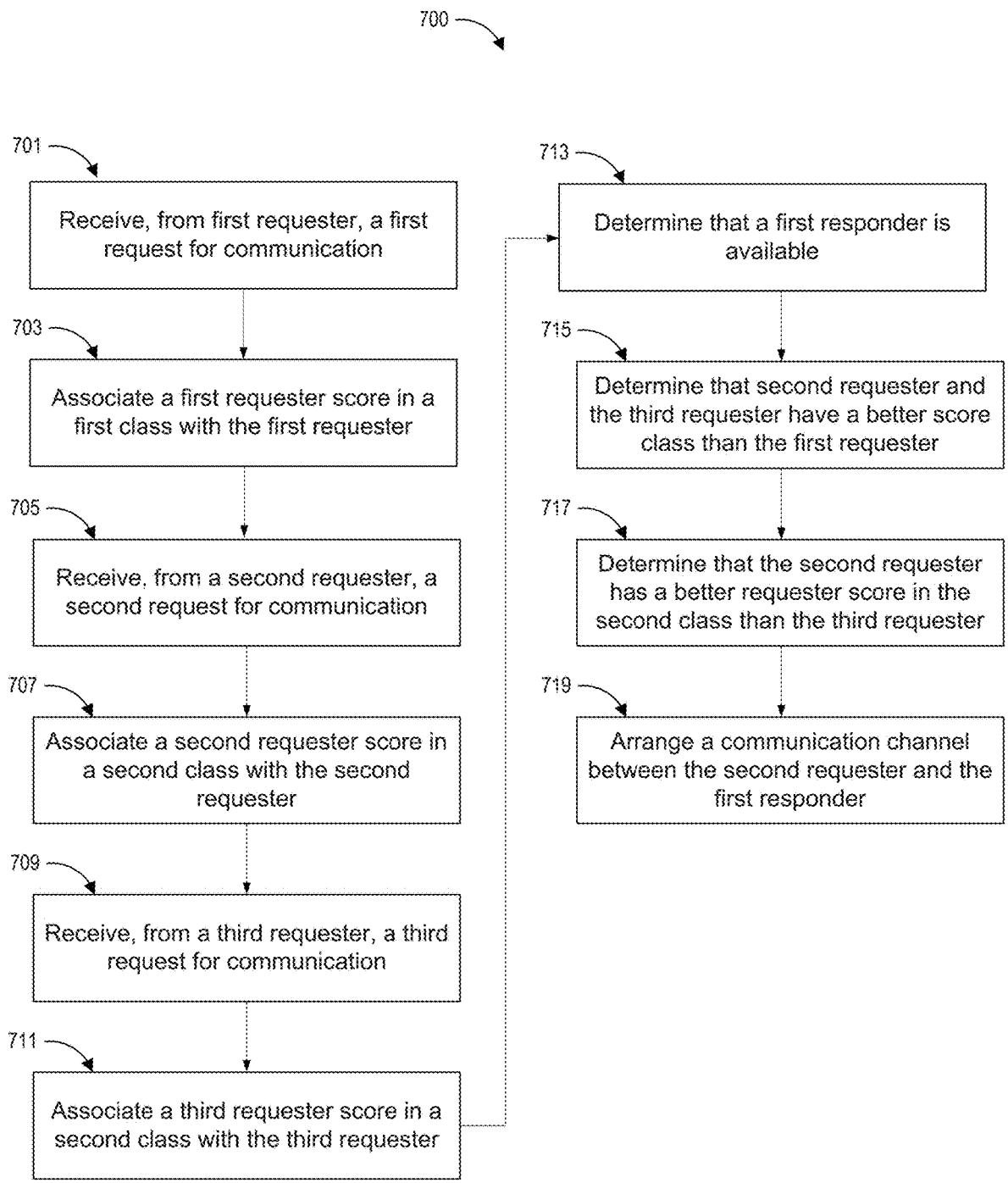
FIG. 7 illustrates an embodiment of a flowchart for matching requesters with different classes of scores to responders.

FIG. 7 illustrates an example flowchart for a process 700 for matching requesters with different classes of scores to responders. The process 700 can be implemented by any system that can identify match requesters with responders and establishing communication channels between the matched requesters and responders. The process 700, in whole or in part, can be implemented by, for example, a communication routing system 100, a matching system 109, and/or a communication infrastructure 115, among others. Although any number of systems, in whole or in part, can implement the process 700, to simplify discussion the process 700 will be described with respect to particular systems. In some embodiments, there can be more than one class of requester score. When assigning a responder to a requester, some classes of requester scores can be prioritized over other classes of requester scores. In the example embodiment discussed with respect to FIG. 7, two classes of requester scores are used, and the second class of requester score is prioritized over the first class of requester score.

At block 701, a first request for communication can be received from a first requester.

At block 703, a first requester score in a first class can be associated with the first requester. The profile for the first requester can track the class of the first requester score and the value of the first requester score, which can increment according to a rate while the first requester waits for an available responder.

At block 705, a second request for communication can be received from a second requester.

At block 707, a second requester score in a second class can be associated with the second requester. The profile for the second requester can track the class of the second requester score and the value of the second requester score, which can increment according to the rate while the second requester waits for an available responder. The second requester can be assigned a requester score in the second class due to one or more of the requester variables discussed with respect to FIG. 2. This can include, for example, assigning a requester score in the second class due to a good community standing 217, a loyalty of the requester 221, or the requester being a valuable or very important person 223. In some embodiments, the class of the requester score can be changed due to any of the dynamic requester variables 203 while a requester is waiting for a response.

At block 709, a third request for communication can be received from a third requester.

At block 711, a third requester score in the second class can be associated with the third requester. The profile for the third requester can track the class of the third requester score and the value of the third requester score, which can increment according to the rate while the third requester waits for an available responder. The third requester can be assigned a requester score in the second class due to one or more of the requester variables discussed with respect to FIG. 2.

At block 713, it can be determined that a first responder is available.

At block 715, it can be determined that the second and third requesters have a prioritized class of requester score. Requesters with the second class of requester score can be prioritized over requesters with the first class of requester score. This can happen even if, for example, the first requester score has a higher value than the second requester score or the third requester score when the first responder becomes available.

At block 717, it can be determined that the second requester has a better requester score than the third requester. This can be based on a comparison or ranking of requester scores of the second class.

At block 719, based at least in part on the determination in block 717, a communication channel can be arranged between the second requester and the first responder.

Continuing the example, the next available responder would be assigned to the third requester due to the third requester's class of score. A subsequently available responder would be assigned to the first requester.

Figure 8:
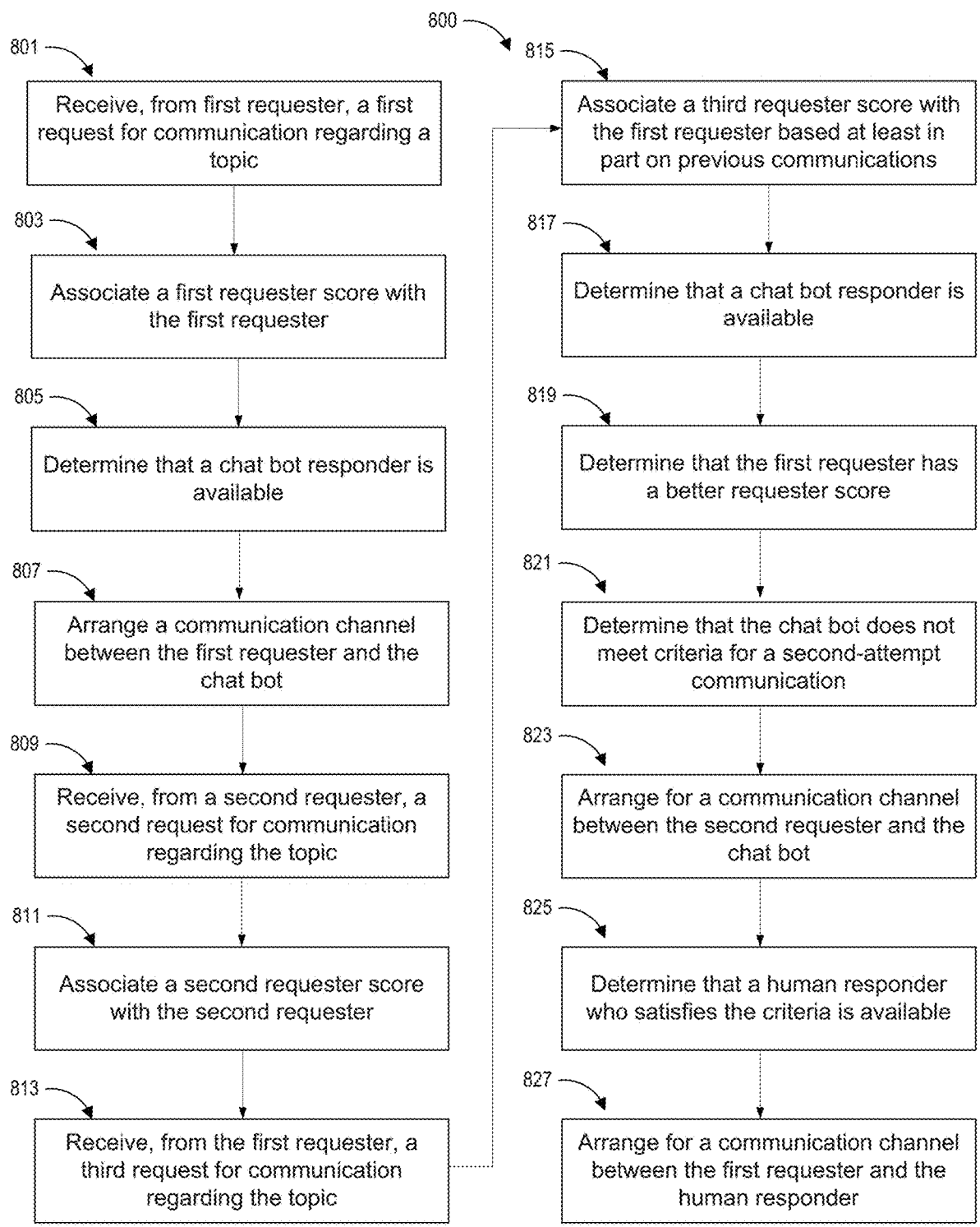
FIG. 8 illustrates an embodiment of a flowchart for matching a returning requester to a responder.

FIG. 8 illustrates an example flowchart of a process 800 for matching a returning requester to a responder. The process 800 can be implemented by any system that can identify match requesters with responders and establishing communication channels between the matched requesters and responders. The process 800, in whole or in part, can be implemented by, for example, a communication routing system 100, a matching system 109, and/or a communication infrastructure 115, among others. Although any number of systems, in whole or in part, can implement the process 800, to simplify discussion the process 800 will be described with respect to particular systems. In some examples, a requester with an issue not resolved during an initial communication session can receive score credit for the initial communication session when determining a requester score for a subsequent session. The matching system can also use minimum criteria, such as having a minimum responder score, to match a responder with the requester for the subsequent session.

At block 801, a first request for communication regarding a topic can be received from a first requester.

At block 803, a first requester score can be associated with the first requester. The profile for the first requester can track the topic and the value of the first requester score, which can increment according to a rate while the first requester waits for an available responder.

At block 805, it can be determined that a chat bot responder is available.

At block 807, a communication channel can be arranged between the first requester and the chat bot.

At block 809, a second request for communication regarding the topic can be received from a second requester.

At block 811, a second requester score can be associated with the second requester. The profile for the second requester can track the topic and the value of the second requester score, which an increment according to the rate while the second requester waits for an available responder.

At block 813, a third request for communication can be received from the first requester regarding the topic. This can happen, for example, if the communication between the first requester and the chat bot did not result in a satisfactory resolution for the first requester. The first requester might, for example, place a second phone call if the initial communication session did not resolve the problem.

At block 815, a third requester score can be associated with the first requester. Based on the data in the profile for the first requester, it can be determined that the topic of the third communication request is the same as the initial topic in block 801. The profile can also log communication requests. Short time intervals between multiple communication requests by the same requester can indicate that the earlier communications did not result in a satisfactory resolution. When the third requester score is determined for the first requester, the third requester score can account for time that the first requester previously spent waiting for a responder and/or spent communicating with the initially arranged chat bot (for example, as discussed with respect to 207 of FIG. 2). For example, as a result, even though the second requester makes a communication request at block 809 before the third request for communication at block 813, and the second requester can accumulate a large value for the second requester score (for example, 100 points). Still, the first requester can be assigned at block 815 a third requester score that credits activities during any of blocks 801, 803, 805, and/or 807 (in addition to any of the other variables discussed with respect to FIG. 2) such that the value (for example, 200 points) of the third requester score is better than the accumulated value (for example, 100 points) of the second requester score.

At block 817, it can be determined that a chat bot responder is available.

At block 819, it can be determined that the first requester has a better requester score.

At block 821, it can be determined that the chat bot does not satisfy criteria for a second-attempt communication with the higher scoring requester. For example, the chat bot might not have a satisfactory feedback rating, experience, or resolution rate as discussed with respect to variables 305, 307, and 309 of FIG. 3. In some examples, only responders who satisfy other variables discussed with respect to FIG. 3, such as being a person (and not a chat bot) and/or have a particular relationship to an organization (for example, full time employees as opposed to part time outside contractors), meet the criteria for satisfying second-attempt communications.

At block 823, a communication channel can be arranged between the second requester and the chat bot, even if the first requester has a higher requester score. This can happen, for example, by assigning the chat bot to respond to the requester with the next best requester score if the chat bot does not meet the criteria to respond to the first requester.

At block 825, it can be determined that a human responder is available. The human responder meets the criteria for second-attempt communications.

At block 827, a communication channel between the first requester and the human responder can be arranged.

Example Hardware Configuration

Figure 9:
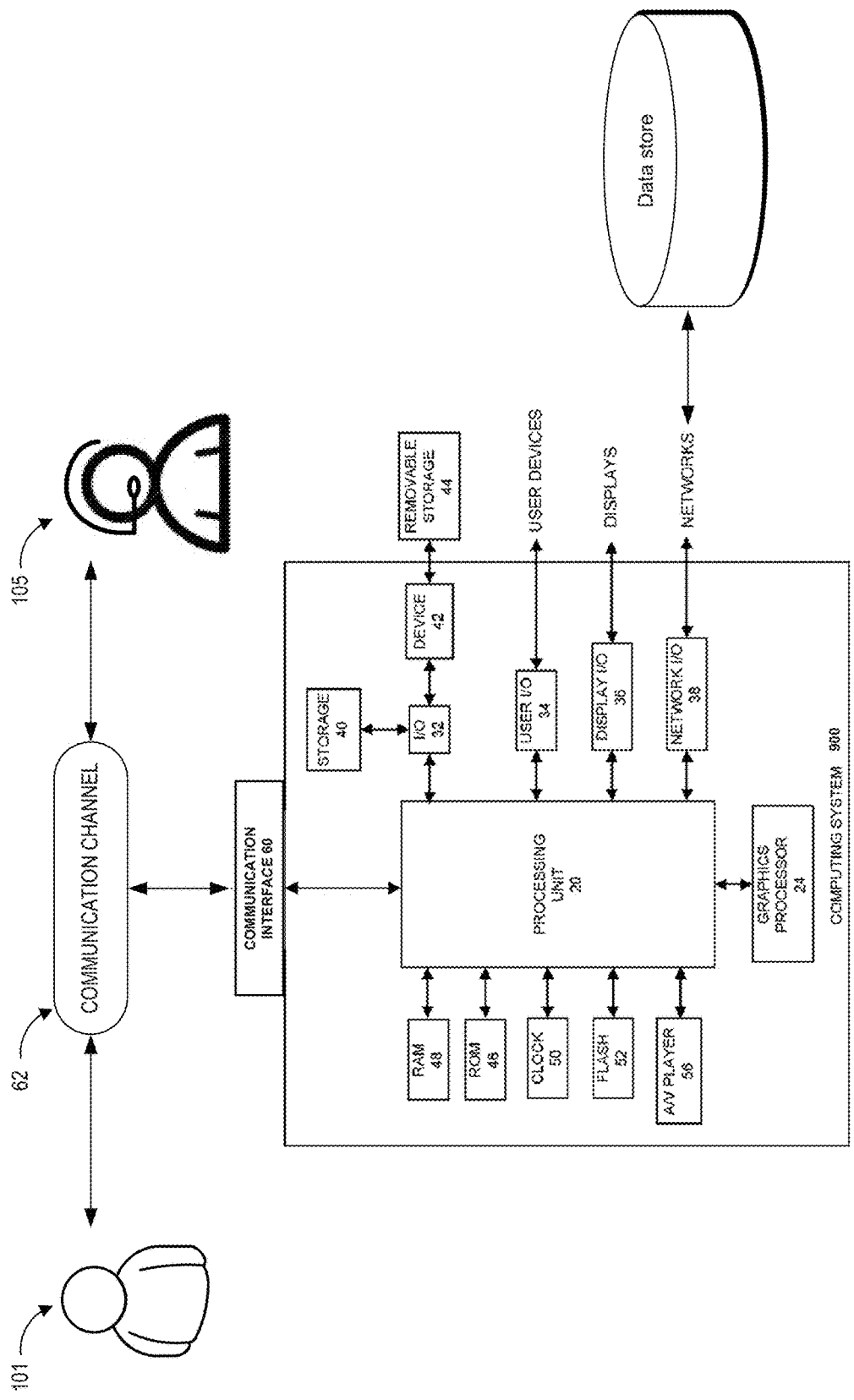
FIG. 9 illustrates an embodiment of a hardware configuration for a computing system.

FIG. 9 illustrates an example hardware configuration for the system 100 shown in FIGS. 1A and 1B. The computing device 900 can be used to implement the matching system 109 for determining matches discussed in FIG. 1. Other variations of the computing device 900 may be substituted for the examples explicitly presented herein, such as removing or adding components to the computing system 900. The computing device 900 may include a smart phone, a tablet, a personal computer, a desktop, a laptop, a smart television, a car console display, and the like. Further, the computing device 900 may include displays such as a monitor, touch-screen display, or a touchscreen interface.

As shown, the computing device 900 includes a processing unit 20 that interacts with other components of the computing device 900 and also components external to the computing device 900.

The computing device 900 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing device 900 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing device 900 also includes various components for enabling input/output, such as an I/O 32, a user I/O 34, a display I/O 36, and a network I/O 38. Data stores (such as data store 103, 107, 111, and 113 described with respect to FIG. 1) can be accessed through the network I/O 38. As previously described, the input/output components may, in some cases, including touch-enabled devices. The I/O 32 interacts with storage element 40 and, through a device 42, removable storage media 44 in order to provide storage for computing device 900. Processing unit 20 can communicate through I/O 32 to store data. In addition to storage 40 and removable storage media 44, computing device 800 is also shown including ROM (Read-Only Memory) 46 and RAM 48. RAM 48 may be used for data that is accessed frequently.

User I/O 34 is used to send and receive commands between processing unit 20 and user devices. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 900 on a display device, such as graphics, user interfaces, video, and/or other visual content. The computing device 900 may comprise one or more integrated displays configured to receive display output signals produced by the display I/O 36, which may be output for display to a user. According to some embodiments, display output signals produced by the display I/O 36 may also be output to one or more display devices external to the computing device 900.

The computing device 900 can also include other features that may be used with a game, such as a clock 50, flash memory 52, and other components. An audio/video player 56 might also be used to display a video sequence. It should be understood that other components may be provided in the computing device 900 and that a person skilled in the art will appreciate other variations of the computing device 900.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. Generally, RAM 48 is volatile storage and data stored within RAM 48 may be lost when the computing device 900 is turned off or loses power.

Information may be read from a memory device, such as RAM 48. Additionally, from storage 40, ROM 46, servers accessed via a network (not shown), or removable storage media 44. Although data is described as being found in RAM 48, it will be understood that data does not have to be stored in RAM 48 and may be stored in other memory accessible to processing unit 20 or distributed among several media, such as storage 40.

A communication infrastructure 60 can be used to establish various communication channels 62. The communication infrastructure 60 can include infrastructures for different types of communication channels 62. It should be understood that there can be additional communication protocol, routing, and configuration devices between the communication infrastructure 60 and the communication channel 62.

ADDITIONAL DESCRIPTIONS

The detailed description presents various descriptions of specific embodiments. However, the innovations described herein can be embodied in a multitude of different ways, for example, as defined and covered by the claims. In this description, reference is made to the drawings where like reference numbers can indicate identical or functionally similar elements. It will be understood that elements illustrated in the figures are not necessarily drawn to scale. Moreover, it will be understood that certain embodiments can include more elements than illustrated in the drawings and/or a subset of the illustrated elements in a particular drawing. Further, embodiments can incorporate any suitable combination of features from two or more drawings.

In the embodiments described above, systems and methods for routing and ordering communications are described with respect to video games and service centers such as call centers in connection with particular embodiments. It will be understood, however, that the principles and advantages of the embodiments can be used for computers to make any ordering decision. This can include prioritization decisions for any type of tasks, such as processing tasks, shipping schedules, any line-based or queue-based waiting system, and the like.

Although certain embodiments are described with reference to a digital gaming platform, it will be understood that the principles and advantages described herein can be used in a variety of applications. Related applications include application processing, computer security, network security, authentication, and the like.

In any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not necessarily be construed to imply that these operations are order dependent. The acts of the methods discussed herein can be performed in any order as appropriate. Moreover, the acts of the methods discussed herein can be performed serially or in parallel, as appropriate. Two blocks shown in succession may, in fact, be executed substantially concurrently, or the blocks may sometimes be executed in the reverse order, depending upon the functionality involved. In addition, certain blocks may be omitted in some implementations.

In some embodiments, the techniques described herein are implemented by one or more special-purpose computing devices. For example, the system 100 of FIG. 1 can be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program non-transitory instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

According to some embodiments, the techniques herein are executed by the one or more processor executing one or more sequences of one or more instructions contained in non-transitory memory or data storage devices in the servers. Such instructions may be read into main memory from another storage medium, such as another storage device or data storage device. Execution of the sequences of instructions contained in memory causes the one or more processors to perform the process steps described herein. In alternative embodiments, hard-wired circuitry may be used in place of or in combination with software instructions.

Memory and data storage devices can be non-transitory media and can include volatile, non-volatile, or both volatile and nonvolatile components. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire, and fiber optics. Transmission media can also take the form of acoustic or light waves, such as those generated during radio-wave and infra-red data communications.

Instructions, when stored in storage media accessible to one or more processors, render a computer system into a special-purpose machine that is customized to perform the operations specified in the instructions. Memory can also be used for storing temporary variables (for example, new training data samples) or other intermediate information during execution of instructions to be executed by the one or more special-purpose processors. Memory can also be a read only memory (ROM), a magnetic disk, optical disk, or USB thumb drive (Flash drive), or other static storage device for storing static information and instructions.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. The term "based on," as generally used herein, encompasses the following interpretations of the term: solely based on or based at least partly on. All numerical values provided herein are intended to include similar values within a measurement error.

Moreover, conditional language used herein, such as, among others, "can," "could," "might," "may," "for example," "for example," "such as" and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein can be embodied in a variety of other forms. Furthermore, various omissions, substitutions, and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A system comprising:
    a communication infrastructure configured to:
        receive a first communication request from a first requester;
        after receiving the first communication request, receive a second communication request from a second requester;
    one or more data storage devices including:
        a plurality of responder profiles, each identifying a topics supported by a responder and a responder score;
        a plurality of requester profiles, each identifying a requester and a requester score;
    one or more processors configured to execute computer-readable instructions that, when executed by the one or more processors, cause the one or more processors to:
        determine a first requester score associated with the first requester, the first requester score comprising a first score value and a first score rate;
        determine a second requester score associated with the second requester, the second requester score comprising a second score value and a second score rate;
        increment the first score value at the first score rate while the first requester waits for a response to the first communication request;
        increment the second score value at the second score rate while the second requester waits for a response to the second communication request;
        while the second requester is waiting for the response, transmit data configured to prompt the second requester to perform an action comprising at least one of:
            accessing a website;
            uploading a document; or
            executing a program;
        detect, while the second requester is waiting for the response, a performance of the action by the second requester;
        in response to detecting the performance of the action by the second requester, modify the second requester score by changing at least one of the second score value or the second score rate;
        after performance of the action by the second requester, receive an indication that a responder is available to respond to one of the first communication request or the second communication request;
        compare the second score value to the first score value; and
        in response to a determination that the second score value is greater than the first score value, configure the communication infrastructure to arrange a communication channel between the second requester and the responder.

2. The system of claim 1, wherein:
    during at least one time before the detection of the performance of the action, the first requester score is better than the second requester score.

3. The system of claim 2, wherein the first score rate and the second score rate begin at a same initial score rate.

4. The system of claim 1, wherein modifying the second requester score includes at least both of:
    changing the second score value; and
    changing the second score rate.

5. The system of claim 1, wherein the action further includes at least one of:
    watching a video tutorial; or
    responding to an unresolved question submitted by a different user in a website forum that is a different communication channel.

6. The system of claim 1, wherein:
    the website displays at least one of: answers to frequently asked questions or a tutorial;
    the document includes at least one of a bill, a screenshot, a crash report, a diagnostic report, or specifications of a computing device; and
    the program is executed in a requested mode.

7. The system of claim 1, wherein the computer-readable instructions, when executed by the one or more processors, are further configured to cause the one or more processors to determine the second score value based at least in part on receiving an indication that the second requester completed a pre-communication action before the second communication request was received.

8. The system of claim 1, wherein the computer-readable instructions, when executed by the one or more processors, are further configured to cause the one or more processors to:
receive, after configuring the communication infrastructure to arrange a communication channel between the second requester and the responder, a third communication request from a third requester;
determine a third requester score associated with the third requester based on at least one requester variable included in a profile for the third requester, wherein the third requester score includes a third score value, a third score rate, and a third score class that is different from a class of the first requester score;
receive an indication that a second responder is available to respond to the first communication request and to respond to the third communication request;
based at least in part on the class of the third score class, configure the communication infrastructure to arrange a communication channel between the third requester and the responder.

9. A method for routing communication requests, the method comprising:
receiving a first communication request from a first requester;
determining a first requester score associated with the first requester, the first requester score comprising a first score value and a first score rate;
receiving a second communication from a second requester after receiving the first communication request;
determining a second requester score associated with the second requester, the second requester score comprising a second score value and a second score rate;
incrementing the first score value of the first requester score at the first score rate while the first requester waits for a response to the first communication request;
incrementing the second score value of the second requester score at the second score rate while the second requester waits for a response to the second communication request;
while the second requester is waiting for the response to the second communication request, transmitting data configured to ask the second requester to perform an action comprising at least one of:
accessing a website;
uploading a document; or
executing a program;
while the second requester is waiting for the response, detecting a performance of the action by the second requester;
in response to detecting the performance of the action by the second requester, modifying at least one of the second score value or the second score rate;
after performance of the action by the second requester, determining that a responder is available to respond to one of the first communication request or the second communication request;
determining that the second score value is better than the first score value; and
in response to the determination that the second score value is better than the first score value, arranging a communication channel between the second requester and the responder.

10. The method for routing communication requests of claim 9, wherein:
before the detection of the performance of the action by the second requester, the first requester score is better than the second requester score.

11. The method for routing communication requests of claim 9, further comprising:
in response to detecting the performance of the action by the second requester, modifying the second score rate to be different from the first score rate.

12. The method for routing communication requests of claim 9, wherein the action further includes at least one of:
watching a video tutorial;
or
responding to an unresolved question submitted by a different person in a website forum that is a different communication channel.

13. The method for routing communication requests of claim 12, wherein:
the website displays at least one of: answers to frequently asked questions or a tutorial;
the document includes at least one of a bill, a screenshot, a crash report, a diagnostic report, or specifications of a computing device; and
the program is executed in a requested mode.

14. The method for routing communication requests of claim 9, further comprising:
detecting an indication of a pre-request activity performed by the first requester; and
wherein at least one of the first score value and the first score rate is based at least in part on the detection of the pre-request activity.

15. The method for routing communication requests of claim 9, further comprising:
receiving, after arranging the communication channel between the first requester and the responder, a third communication request from a third requester;
determining a third requester score associated with the third requester based on at least one requester variable included in a profile for the third requester, wherein the third requester score includes a third score rate, a third score value, and a third score class that is different from a class of the first requester score;
receiving an indication that a second responder is available to respond to the first communication request and to respond to the third request; and
based at least in part on the third score class, arranging a communication channel between the third requester and the responder.

16. A system comprising data storage devices and one or more processors configured to execute computer-readable instructions from the data storage devices that, when executed by the one or more processors, cause the one or more processors to:
receive a first communication request from a first requester;
after receiving the first communication request, receive a second communication request from a second requester;
assign, as part of a profile for the first requester, a first requester score associated with the first requester, the first requester score comprising a first score value and a first score rate;
assign, as part of a profile for the second requester, a second requester score associated with the second requester, the second requester score comprising a second score value and a second score rate;

increment the first score value at the first score rate while the first requester waits for a response to the first communication request;

increment the second score value at the second score rate while the second requester waits for a response to the second communication request;

while the second requester is waiting for the response, transmit data configured to prompt the second requester to perform an action comprising at least one of:
  accessing a website;
  uploading a document; or
  executing a program;

detect, while the second requester is waiting for the response, a performance of the action by the second requester;

in response to detecting the performance of the action by the second requester, modify the second requester score by changing at least one of the second score value or the second score rate;

after performance of the action by the second requester, receive an indication that a responder is available to respond to one of the first communication request or the second communication request;

comparing the second score value to the first score value; and in response to a determination that the second score value is greater than the first score value, configure a communication infrastructure to arrange a communication channel between the second requester and the responder.

17. The system of claim 16, wherein:
during at least one time before the detection of the performance of the action, the first score value better than the second score value.

18. The system of claim 16, during at least one time before the detection of the performance of the action, the first score rate is equal to or faster than the second score rate.

19. The system of claim 16, wherein modifying the second requester score includes both of:
  changing the second score value; and
  changing the second score rate.

20. The system of claim 16, wherein the computer-readable instructions, when executed by the one or more processors, are further configured to cause the one or more processors to:

receive, after configuring the communication infrastructure to arrange a communication channel between the second requester and the responder, a third communication request from a third requester;

determine a third requester score associated with the third requester based on at least one requester variable included in a profile for the third requester, wherein the third requester score includes a third score rate, a third score value, and a third score class that is different from a class of the first requester score;

receive an indication that a second responder is available to respond to the first communication request and to respond to the third request; and based at least in part on the third score class, configure the communication infrastructure to arrange a communication channel between the third requester and the responder.

* * * * *